US010489297B2

(12) United States Patent
Heirman et al.

(10) Patent No.: US 10,489,297 B2
(45) Date of Patent: Nov. 26, 2019

(54) PREFETCHING TIME ALLOCATION

(71) Applicant: INTEL CORPORATION, Santa Clara, CA (US)

(72) Inventors: Wim Heirman, Ghent (BE); Yves Vandriessche, Brussels (BE); Ibrahim Hur, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 4 days.

(21) Appl. No.: 15/439,551

(22) Filed: Feb. 22, 2017

(65) Prior Publication Data

US 2018/0239705 A1    Aug. 23, 2018

(51) Int. Cl.
| G06F 12/08 | (2016.01) |
| G06F 13/00 | (2006.01) |
| G06F 12/0862 | (2016.01) |
| G06F 9/30 | (2018.01) |
| G06F 12/0875 | (2016.01) |
| G06F 9/38 | (2018.01) |
| G06F 12/0846 | (2016.01) |

(52) U.S. Cl.
CPC ...... G06F 12/0862 (2013.01); G06F 9/30047 (2013.01); G06F 9/30181 (2013.01); G06F 9/383 (2013.01); G06F 12/0875 (2013.01); G06F 12/0848 (2013.01); G06F 2212/1021 (2013.01); G06F 2212/1024 (2013.01); G06F 2212/452 (2013.01); G06F 2212/502 (2013.01); G06F 2212/6028 (2013.01)

(58) Field of Classification Search
CPC ............ G06F 12/0862; G06F 12/0875; G06F 2212/1021; G06F 2212/452; G06F 2212/602; G06F 9/30047; G06F 9/3802
See application file for complete search history.

(56) References Cited

U.S. PATENT DOCUMENTS

2003/0028694 A1* 2/2003 Aboulenein ........ G06F 13/4031
                                                                  710/107

* cited by examiner

*Primary Examiner* — Yong J Choe
(74) *Attorney, Agent, or Firm* — Lowenstein Sandler LLP

(57) ABSTRACT

An example processor that includes a register, a cache, a processor core, and a programmable logic circuit. The register may store a first prefetch value indicating a first amount of time to prefetch data from a memory prior to an execution of a subsequent instruction that uses the data. The processor core may be coupled to the cache and the register. The processor core may execute a prefetch instruction to access the data from the memory, store a copy of the data in the cache, and execute the subsequent instruction. The programmable logic circuit may be coupled to the processor core. The programmable logic circuit may determine whether the first amount of time is insufficient to prefetch the data for the execution of the subsequent instruction and change the first prefetch value to a second prefetch value when the first amount of time is insufficient.

13 Claims, 13 Drawing Sheets

PREFETCHING TIME ALLOCATION

BACKGROUND

A prefetching instruction is an instruction in a program that can cause a processor to access data in anticipation of an upcoming data request by the program or a user. The processor may temporarily cache the data until the data is requested or discarded. The prefetching instruction may be used by programs, such as internet browsers, to cache data that is frequently accessed by a program or user, such as images, video, text, and so forth.

BRIEF DESCRIPTION OF THE DRAWINGS

Various embodiments of the present invention will be understood more fully from the detailed description given below and from the accompanying drawings of various embodiments of the invention.

DESCRIPTION OF EMBODIMENTS

When executing a set of instructions for a program, a processor may retrieve data from a memory as part of executing an instruction of the set of instructions. Retrieving the data from the memory at the time the instruction is executed may add a latency to the processing of the instruction. The latency may decrease the performance of the program.

To reduce or eliminate the latency, the processor may speculatively retrieve data from the memory and store the data at a cache prior to an execution of the instruction (referred to herein as prefetching). Storing the data at the cache may reduce the latency because the cache may be closer in distance to the processor and may provide a faster access time to data than the memory. However, the amount of time to retrieve the data for a prefetch instruction may vary because of a change in an amount of time to retrieve data from memory, a type of the memory, a change in a clock frequency of a processor, interference other cores of a multi-core system, and so forth.

When the data is not retrieved a sufficient amount of time prior to an execution of the instruction, the processor may have wait to retrieve the data from the memory. The waiting for the data may delay the processor in executing the instruction (referred to hereafter as a late prefetch). When a late prefetch occurs, the processor may waste time and resources in performing the prefetch. Additionally, when the amount of time the data is retrieved prior to the execution of the instruction is earlier than needed (referred to hereafter as an early prefetch), the cache may be wasted because the cache may be filled with data that isn't being used. When an early prefetch occurs, the data may be evicted prior to executing the instruction.

The embodiments described herein may address the above-noted deficiencies by providing a programmable logic circuit to determine an amount of time is sufficient to prefetch the data for the execution of an instruction for a program. When the amount of time is insufficient, the programmable logic circuit may increase the amount of time to prefetch the data. Additionally, when the amount of time is longer than is needed, the programmable logic circuit may decrease the amount of time to prefetch the data. The programmable logic circuit may adjust the amount of time to reduce the number of early prefetches and late prefetches.

Figure 1:
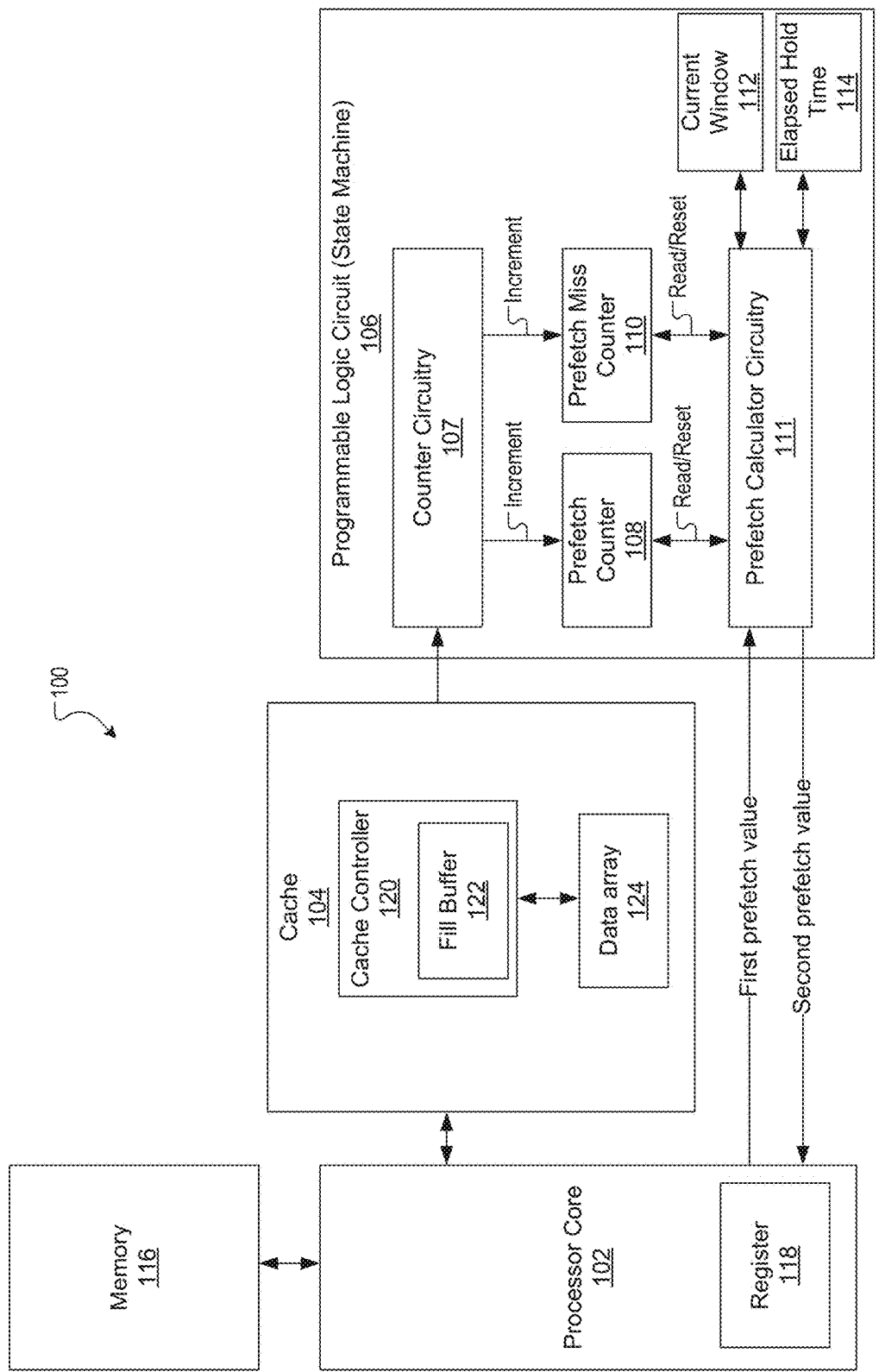
FIG. 1 illustrates a system to that includes a programmable logic circuit to determine a prefetch value that indicates an amount of time to retrieve data prior to an execution of a subsequent instruction that uses the data according to one embodiment.

FIG. 1 illustrates a system 100 that includes a system 100 with a programmable logic circuit 106 to determine a prefetch value that indicates an amount of time to retrieve data prior to an execution of a subsequent instruction that uses the data according to one embodiment. The system 100 may include a processor core 102, a cache 104, the programmable logic circuit 106, and a memory 116. The processor core 102 may include a register 118 to store the prefetch value, as discussed below.

The memory 116 may be coupled to the processor core 102. The memory 116 may store data. The data may be accessed by the processor core 102 when executing a prefetch instruction prior to a subsequent instruction that requests the data. The subsequent instruction may use the data in performing a task, such as a processing task or modifying the data. The cache 104 may also be coupled to the processor core 102. The cache 104 may include a cache controller 120, a fill buffer 122, and a data array 124.

The cache controller 120 may be a program or circuitry that check if data in the memory has previous been copied to the cache 104. When a prefetch request is received from the processor core 102 for data already stored in the cache, the cache controller 120 may deny the request as the data is already stored in the data array 124. The data array 124 may be an array in the cache that stores data copied from the memory 116. The data array 124 may store the data for a period of time, after which the processor core 102 or the cache controller 120 may remove the data from the data array 124 to prevent the data array 124 from running out of room to store data.

The fill buffer 122 may include entries indicating what data has been stored in the data array 124 of the cache 104. An entry in the fill buffer 122 may be allocated each time data is written to the data array 124. In one example, the fill buffer may store an entry indicating that the data array is storing data copied from the memory 116 when a prefetch instruction has been executed. In another example, the fill buffer 122 may store an entry indicating that the data array 124 is storing data copied from the memory 116 when a non-prefetch instruction has been executed, such as a complex instruction set computing (CISC) memory store instruction. In another example, the fill buffer 122 may include entries for data on which a request to memory 116 is currently in progress. When a copy of the data from the memory 116 is sent to the fill buffer 122, a corresponding fill buffer entry is freed. In another implementation, the fill buffer 122 may be integrated into the processor core 102.

The processor core 102 may store data at the data array 124 for a threshold period of time. In one implementation, the processor core 102 may copy data from the memory 115 and temporarily store the data at the data array 124. The copy of the data may be stored at the data array 124 so that the processor core 102 may access the copy of data more quickly than the original data stored at the memory 116 when executing a subsequent instruction. The processor core 102 may include a register 118. The register 118 may store a current prefetch value indicating an amount of time to prefetch data from the memory 116 prior to an execution of a subsequent instruction that uses the data. The prefetch calculator circuitry 111 may store an updated prefetch value at the register 118.

The programmable logic circuit 106 (referred to hereafter as a state machine) may be coupled to the cache 104. In one implementation, the state machine 106 may be a hardware device, such as circuitry or a processing device. The state machine 106 may include counter circuitry 107, a prefetch counter 108, a prefetch miss counter 110, prefetch calculator circuitry 111, a first register 112, and a second register 114. In one implementation, the counter circuitry 107 may determine whether to increment a prefetch counter value stored at the prefetch counter 108. In another implementation, the counter circuitry 107 may determine whether to increment a late prefetch counter value stored at the prefetch miss counter 110, as discussed below. In another implementation, the counter circuitry 107 may determine other counter information, such as a count value for a number of entries stored in the data array 124. The prefetch calculator circuitry 111 may determine a prefetch value, as discussed below. The first register 112 may store a current window value as determined by the prefetch circuitry 111. The second register 114 may store an elapsed hold time value as determined by the prefetch circuitry 111.

The system 100 may also include a graphics core, a peripheral, or other components coupled to the processor core 102. For example, the graphics core may be coupled to the processor core 102. The graphics core may generate graphic using result data obtained by the processor core 102 when a program is executed.

Figure 2:
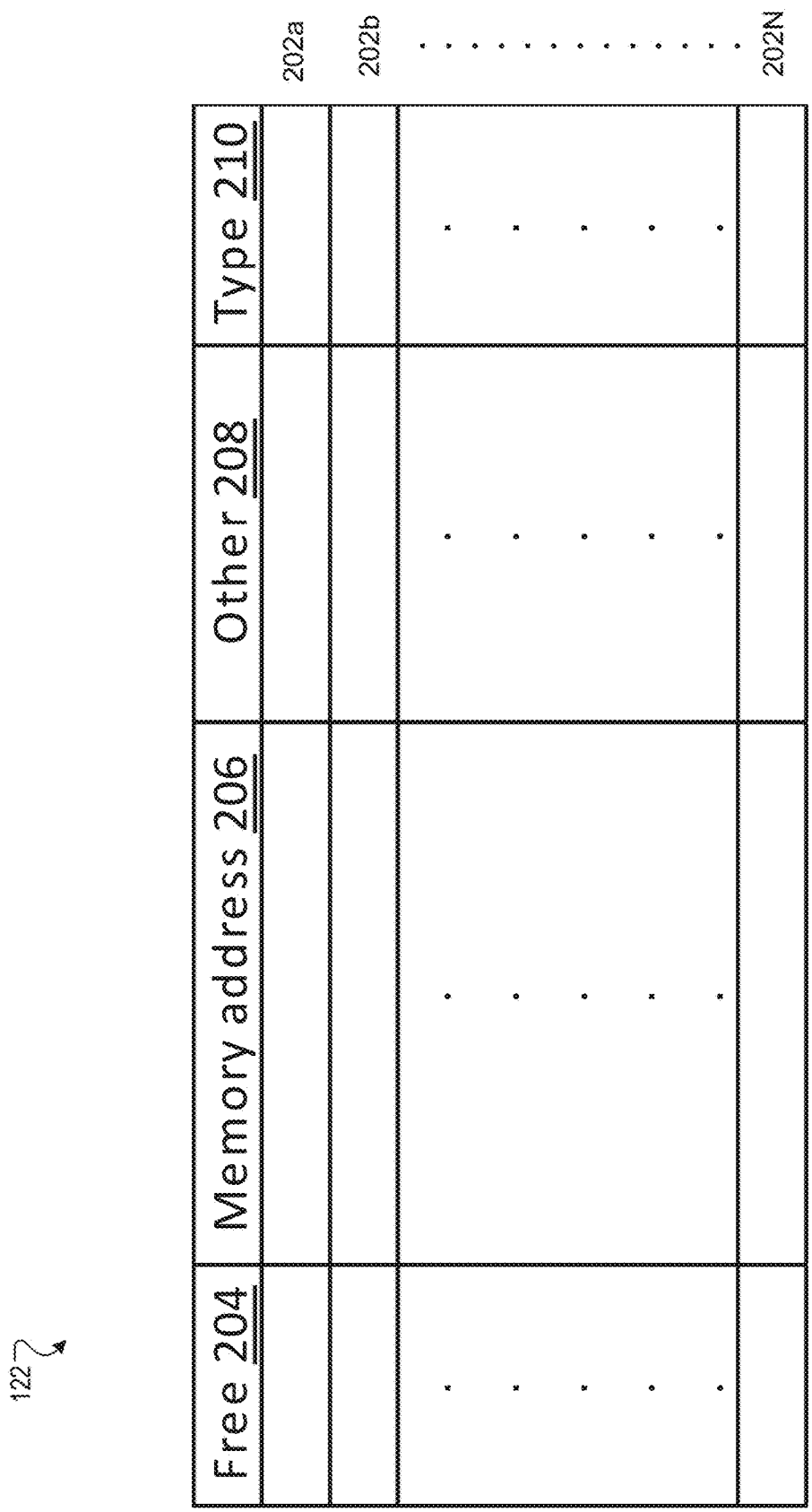
FIG. 2 illustrates the fill buffer with entries according to one embodiment.

FIG. 2 illustrates the fill buffer 122 with entries 202a-202N according to one embodiment. Some of the features in FIG. 2 are the same or similar to some of the features in FIG. 1 as noted by same reference numbers, unless expressly described otherwise.

Each of the entries 202a-202N may store information associated with data stored in the data array 124. For example, entry 202a may include a free entry field 204 to store a free entry value. The free entry value may be one or more bits indicating whether the entry at the data array 124 is empty or at least partially filled. The entry 202a may also include a memory address field 206 to store a memory address. The memory address may be one or more bits indicating a memory address of the data in the memory 116. The entry 202a may also include an other field 208 that may store an other value. The other value may be one or more bits indicating an implementation-specific state of the entry 202a. The entry 202a may also include a type field 210 to store a type value. The type value may be one or more bits indicating a type of a request to access the data stored in the memory 116.

In one example, when a cache miss occurs, the processor core 102 may copy data from the memory 116 to the data array 124. In another example, when a prefetch instruction is executed and the data requested from the memory 116 is not stored at the data array 124 by the time the data is needed for the execution of a subsequent instruction that uses the data, information associated with the cache miss is stored in the entry 202a. In response to storing of data in the data array 124, the state machine 106 may perform a method to determine a prefetch value as shown in method 300 of FIG. 3 and method 400 of FIG. 4.

Figure 3:
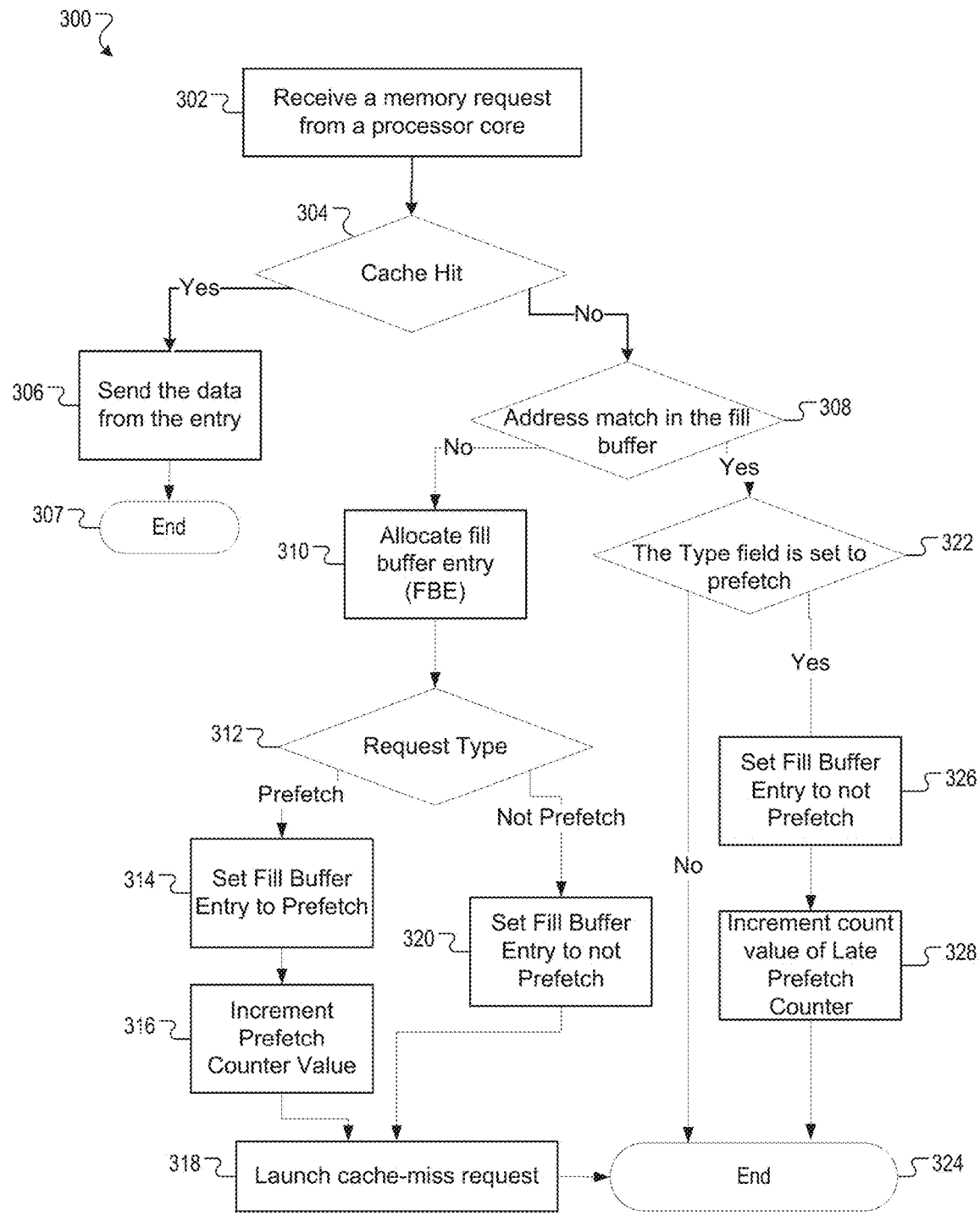
FIG. 3 illustrates a flowchart of the method for determining whether an amount of time is insufficient to prefetch the data for the execution of the subsequent instruction according to one embodiment.

FIG. 3 illustrates a flowchart of the method 300 for determining whether an amount of time is insufficient to prefetch the data for the execution of the subsequent instruction according to one embodiment. The method 300 may at least partially be performed by processing logic that includes hardware (e.g., circuitry, dedicated logic, programmable logic, microcode, etc.), software (e.g., instructions executed by a processing device), firmware or a combination thereof. In one embodiment, the method 300 may be performed by all or part of the system 100 of FIG. 1. For example, the method 300 may be performed by the counter circuitry 107.

Referring to FIG. 3, the method 300 begins with the state machine receiving a copy of a request to access data stored in a memory (block 302). The copy of the request including a first memory address of the data at the memory. The method may include the state machine determining whether the cache includes an entry storing the copy of the data (block 304). For example, the cache may store the copy of the data at the data array. The method may include the state machine sending the data from the entry to the processor core when the cache includes the entry storing the copy of the data (block 306). In response to sending the data from the entry to the processor core, the method may end (block 307).

In one implementation, when the cache does not include an entry storing the copy of the data, the state machine determining whether the first memory address in the request matches a second memory address in an entry in the fill buffer of the cache (block 308). For example, when the data array does not include an entry storing the copy of the data (referred to hereafter as a cache miss), the cache controller may to check the fill buffer for duplicate entries with the same data and filter out duplicate requests to the same data. In one example, the cache miss may occur when the processor core is executing a load or store instruction. When the first memory address in the request does not match the second memory address in an entry of the fill buffer, the state machine may allocate a new entry in the fill buffer for the memory address (block 310). The method may include the state determining whether the request is the prefetch instruction (block 312).

In another implementation, when the request is a prefetch instruction, the state machine may set a type value for a type field for the entry at the fill buffer to indicate the request is a prefetch instruction (block 314). For example, a type value of 1 may indicate the request is the prefetch instruction. When the request is a prefetch instruction, the state machine may also increase a prefetch counter value of the prefetch counter (block 316). The prefetch counter value may indicate a number of prefetch instructions previously executed by the processor core. In response to setting the type value and increment the prefetch counter value, the state machine may also execute a cache miss instruction (block 318). The method may include end (block 324). In response to sending the data from the entry to the processor core, the method may end (block 324). In one implementation, the ending of method 300 may include sending instructions to increment the prefetch counter value at the prefetch counter 108 in FIG. 1 or the late prefetch counter value at the prefetch miss counter 110 in FIG. 1.

In another implementation, when the request is not a prefetch instruction, the state machine 106 may set the type value for the type field at the entry to indicate the request is not a prefetch instruction (block 320). For example, a type value of 0 may indicate the request is not the prefetch instruction. In response to setting the type value as not a prefetch instruction, the state machine 106 may also execute a cache miss instruction (block 318). The method may include end (block 324). In response to sending the data from the entry to the processor core, the method may end (block 324). In one implementation, the ending of method 300 may include sending instructions to increment the prefetch counter value at the prefetch counter 108 in FIG. 1 or the late prefetch counter value at the prefetch miss counter 110 in FIG. 1.

In another implementation, when the first memory address in the request does not match a second memory address in an entry in the fill buffer of the cache, the state machine may determine whether a type value for the type field at the entry indicates that the request is a prefetch request (block 322). For example, a type value of 0 may indicate the request is not a prefetch instruction and a type value of 1 may indicate the request is a prefetch instruction. In one implementation, when the type value indicates the request is not the prefetch instruction, the method may include returning to the execution of the process by the state machine in FIG. 1 (block 324). In another implementation, when the type value indicates the request is the prefetch instruction, the state machine may set the type field to indicate that the request is not a prefetch instruction (block 326). When the type value indicates the request is not the prefetch instruction, the state machine may increase a count value of the prefetch miss counter. The prefetch miss counter value may indicate a number of late prefetches for the prefetch instructions previously executed by the processor core. The method may include end (block 324). In response to sending the data from the entry to the processor core, the method may end (block 324). In one implementation, the ending of method 300 may include sending instructions to increment the prefetch counter value at the prefetch counter 108 in FIG. 1 or the late prefetch counter value at the prefetch miss counter 110 in FIG. 1.

Figure 4:
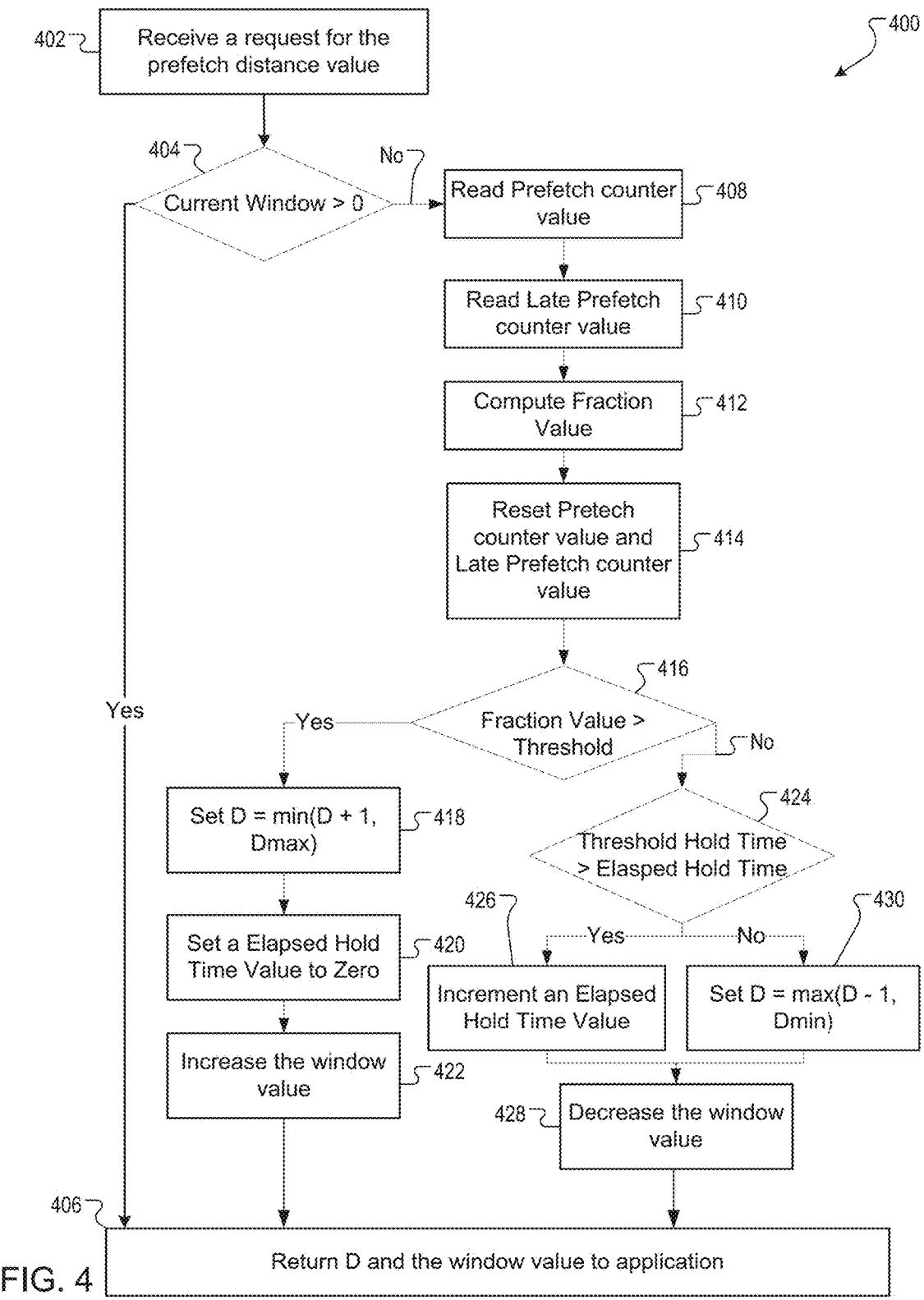
FIG. 4 illustrates a flowchart of a method for updating the first prefetch value to the second prefetch value according to one embodiment.

FIG. 4 illustrates a flowchart of a method 400 for updating a first prefetch value to a second prefetch value according to one embodiment. The method 400 may at least partially be performed by processing logic that includes hardware (e.g., circuitry, dedicated logic, programmable logic, microcode, etc.), software (e.g., instructions executed by a processing device), firmware or a combination thereof. In one embodiment, the method 400 may be performed by all or part of the system 100 of FIG. 1. For example, the method 400 may be performed by the prefetch calculator circuitry 111. Some of the features discussed below in relation to FIG. 4 are the same or similar to some of the features discussed above in relation to FIG. 1 as noted by same reference numbers, unless expressly described otherwise.

Referring to FIG. 4, the method 400 begins a prefetch calculator circuitry receiving a request for the second prefetch value from a processor core (block 402). For example, the first prefetch value may be a prefetch value currently stored at a register and the second prefetch value may be an updated prefetch value. The request may include the first prefetch value and a window value indicating a first amount of time prior to a second request for the second prefetch value. The method may include the prefetch calculator circuitry determining whether a second amount of time prior to the execution of the subsequent instruction exceeds a threshold amount of time (block 404). The second amount of time exceeding the threshold amount of time indicates that the first amount of time is sufficient. In one example, the threshold amount of time may be zero seconds. In another example, the threshold amount of time may be represented as an amount of time taken by a number of processor cycles.

In another implementation, when the second amount of time prior to the execution of the subsequent instruction exceeds a threshold amount of time, the prefetch calculator circuitry may send a response to the processor core indicating that the first prefetch value (D) and the window value are correct (block 406). For example, the prefetch calculator circuitry may store the first prefetch value and the window value at a register at a processor core, such as register 118 in FIG. 1. An application may periodically read the first prefetch value and the window value. The read may trigger the prefetch calculator circuitry determine whether to update the first prefetch value and determine the first prefetch is correct. The processor core may read the first prefetch value and the window value at each iteration of a loop iteration in a set of instruction for the application.

In another implementation, when the first amount of time prior to the execution of the subsequent instruction exceeds a threshold amount of time, the prefetch calculator circuitry may read a first counter value at a prefetch counter of the prefetch calculator circuitry (block 408). The first counter value may be a prefetch counter value. When the first amount of time prior to the execution of the subsequent instruction exceeds a threshold amount of time, the prefetch calculator circuitry may read a prefetch miss counter value at a prefetch miss counter of the prefetch calculator circuitry (block 410). The second counter value may be a prefetch miss counter value. The method may include the prefetch calculator circuitry dividing the second count value by the first count value to obtain a fraction value (block 412). The method may include the prefetch calculator circuitry resetting the first count value and the second count value (block 414). The method may include the state machine determining whether the fraction value exceeds a threshold value (block 416).

In another implementation, when the fraction value exceeds a threshold value, the prefetch calculator circuitry may increase the first prefetch value by a defined value to obtain the second prefetch value (block 418). In one implementation, the first prefetch value may be iteratively increased by the defined value until the first prefetch value reaches a maximum prefetch value. The method may include the state machine setting an elapsed time value to zero (block 420). The method may include the prefetch calculator circuitry increasing the first window value by a third amount of time to obtain a second window value (block 422). The method may include the prefetch calculator circuitry storing the second prefetch value (D) and the second window value at a register of a processor core (block 406).

In another implementation, when the fraction value does not exceed a threshold value, the prefetch calculator circuitry may determine whether a fourth amount of time that a copy of the data from a memory is stored at the cache exceeds a second threshold amount of time (block 424). When the fourth amount of time that the copy of the data is stored at the cache does not exceed a second threshold amount of time, the state machine may increase the second amount of time by a fourth amount of time (block 426). The method may include the prefetch calculator circuitry decreasing the first window value by a fifth amount of time to obtain a second window value (block 428). The method may include the prefetch calculator circuitry storing the second prefetch value (D) and the second window value at the register (block 406).

In another implementation, when the fourth amount of time that the copy of the data is stored at the cache exceeds a second threshold amount of time, the state machine may decrease the first prefetch value by a defined value to obtain the second prefetch value (block 430). In one example, when the prefetch miss counter value does not exceed a threshold value, the prefetch value may be held constant for a period of time, prior to decrementing the prefetch value. In one example, the prefetch value may be iteratively decrementing by the defined value until a minimum prefetch value is reached. The method may include the prefetch calculator circuitry decreasing the first window value by the fifth amount of time to obtain a second window value (block 428). The method may include the state machine storing the second prefetch value (D) and the second window value at the register at a processor core, such as the register 118 in FIG. 1 (block 406). The prefetch value may be iteratively adjusted until a number of early prefetch and late prefetches are reduced or reaches zero.

The following code illustrates an example of a determination of a prefetch distance:

```
spmv_csr(double* y, int* row_ptr, int* cols, double* values, double* x)
{for (int row = 0; row < A->nrow; row++)
{double tmp = 0;
for (int i = row_ptr[row]; i < row_ptr[row + 1]; i++)
{_builtin_prefetch( &x[cols[i+PREFETCH_DISTANCE]] );
tmp += values[i] * x[cols[i]];}
y[row] = tmp;}
```

The function spmv_csr may perform a sparse matrix-vector multiplication on a compressed-row matrix storage format, where a loop body calculates a inner product of a single matrix row with the input vector x. An input matrix of the function spmv_csr may be represented by mulitple arrays. For example, a cols array and a values array store the indices and values of each non-zero matrix element in row major order, respectively. In another example, a row_ptr array may store the index into cols and values of each non-zero at the start of a row.

The following code illustrates an example of a determination of a prefetch distance that may be variable and periodically updated:

```
spmv_csr(double* y, int* row_ptr, int* cols, double* values, double* x)
{for (int row = 0; row < A->nrow; row++)
{size_t PREFETCH_DISTANCE = _builtin_swp_distance( );
double tmp = 0;
for (int i = row_ptr[row]; i < row_ptr[row + 1]; i++)
{_builtin_prefetch( &x[cols[i+PREFETCH_DISTANCE]] );
tmp += values[i] * x[cols[i]];}
y[row] = tmp;}
```

The values and cols arrays may be accessed in sequence. The PREFETCH_DISTANCE may be a variable whose value is periodically updated.

Figure 5:
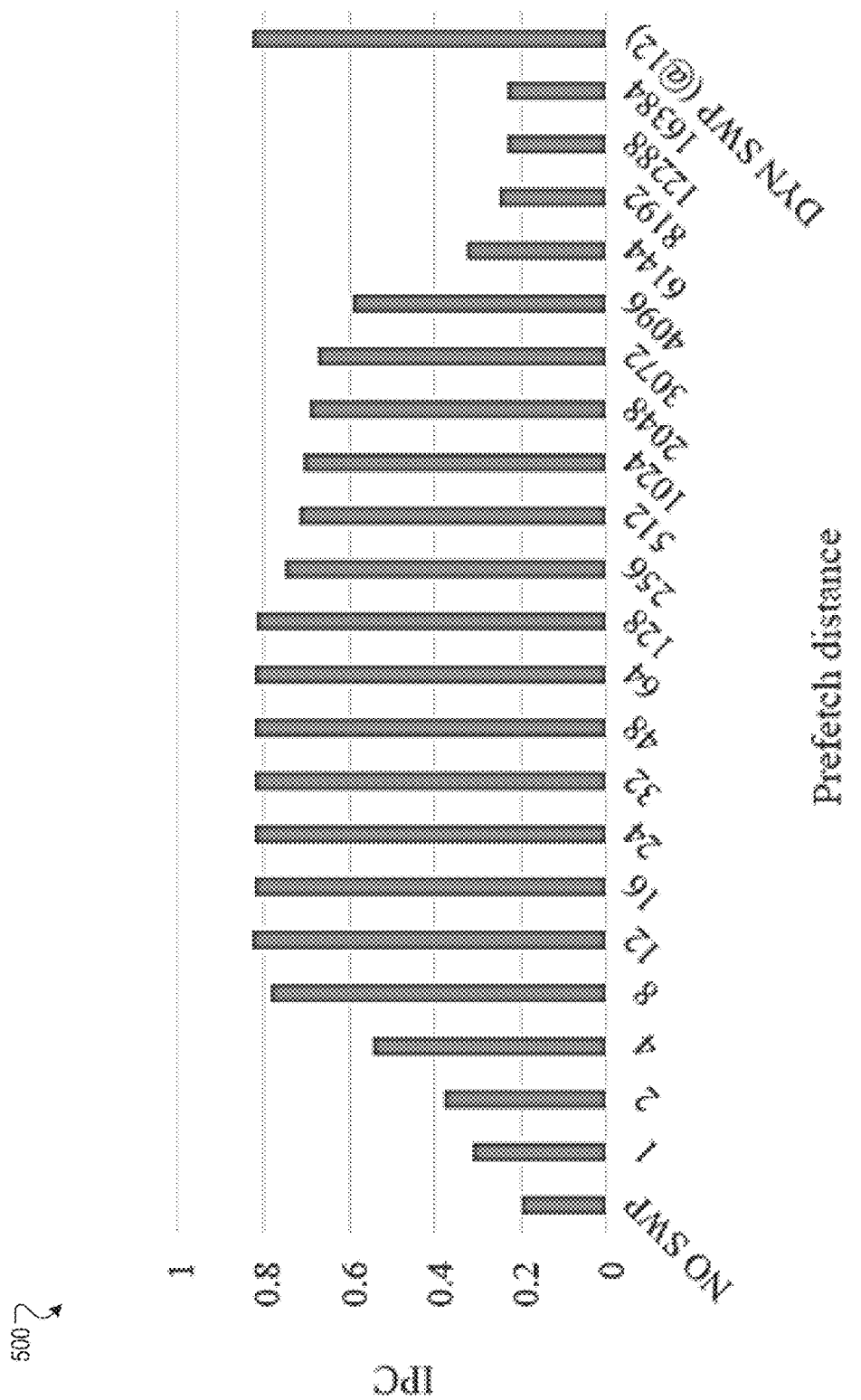
FIG. 5 illustrates a graph of instructions per cycle (IPC) for different prefetch distances according to one embodiment

FIG. 5 illustrates a graph 500 of instructions per cycle (IPC) for different prefetch distances according to one embodiment. As a latency for the prefetch distances decreases, the IPC may increase. In one example, for prefetch distances between 12 and 128, the IPC may exceed 0.8 IPC. In this example, when the IPC exceeds 0.8, the performance of an operation may not be affected by a latency from retrieving data. For a prefetch distance that is greater than 128, an early prefetch may occur and the data may be evicted from a cache the data is used. A prefetch distance set to a value below 12 may result in late prefetches which delays the processor from executing an instruction.

Figure 6:
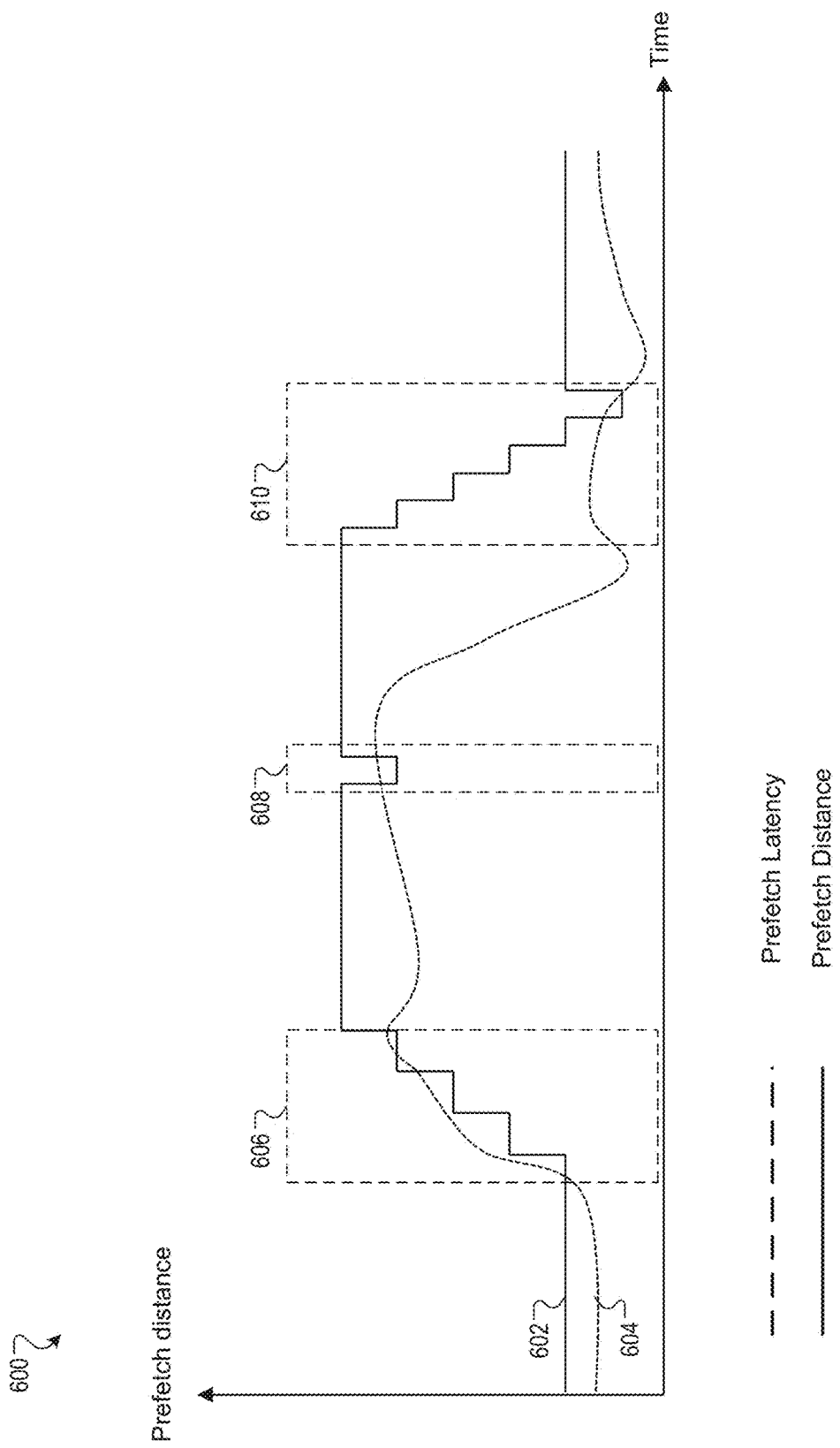
FIG. 6 illustrates a graph of the prefetch distance as a prefetch latency changes over time according to one embodiment.

FIG. 6 illustrates a graph 600 of the prefetch distance 602 as a prefetch latency 604 changes over time according to one embodiment. The prefetch latency 604 may indicate an amount of time it takes a processor to retrieve data when executing a prefetch instruction. The prefetch latency 604 may vary over time as criteria of the system 100 changes. For example, the prefetch latency 604 may vary as an amount of time to retrieve data from the memory 116 varies. In one example, as the amount of time to retrieve data from the memory 116 increase, the amount of time to prefetch data prior to an execution of a subsequent instruction using the data may increase. In another example, as the clock frequency of the processor core 102 increases, the amount of time to prefetch data prior to an execution of a subsequent instruction using the data may increase.

When the prefetch distance 602 is smaller than the prefetch latency, late prefetches may occur. For example, at period 606, the prefetch distance 602 is below the prefetch latency 604 for the threshold period of time. When the prefetch distance 602 may is below the prefetch latency 604 for a threshold period of time, the state machine 106 may detect an increase late prefetches and may iteratively increase the prefetch value until the prefetch distance 602 is above the prefetch latency 604.

The state machine 106 may periodically check the prefetch distance 602 and the prefetch latency 604 to determine when the prefetch distance 602 may is below the prefetch latency 604. To check whether the prefetch distance 602 may is below the prefetch latency 604, the state machine 106 may decrease the prefetch distance by a defined amount. At period 608, when the state machine 106 decreases the prefetch distance by the defined amount, the state machine 106 may determine that the prefetch distance 602 may is below the prefetch latency 604 and increase the prefetch distance by the defined amount. At period 610, when the state machine 106 decreases the prefetch distance by the defined amount, the state machine 106 may determine that the prefetch distance 602 is not below the prefetch latency 604 and continue to decrease the prefetch distance by the defined amount until the prefetch distance 602 is below the prefetch latency 604. When the prefetch distance 602 reaches a value that is below the prefetch latency 604, the state machine 106 may increase the prefetch distance by the defined amount and continue to monitor the difference between the prefetch distance 602 and the prefetch latency 604.

In one implementation, the prefetch distance 602 may be increased and decreased by the same amount as the state machine 106 adjusts the prefetch distance 602 to be above the prefetch latency 604. In another implementation, the prefetch distance 602 may be increased by a first defined amount and decreased by a second defined amount where the first defined amount is different than the second defined amount.

Figure 7:
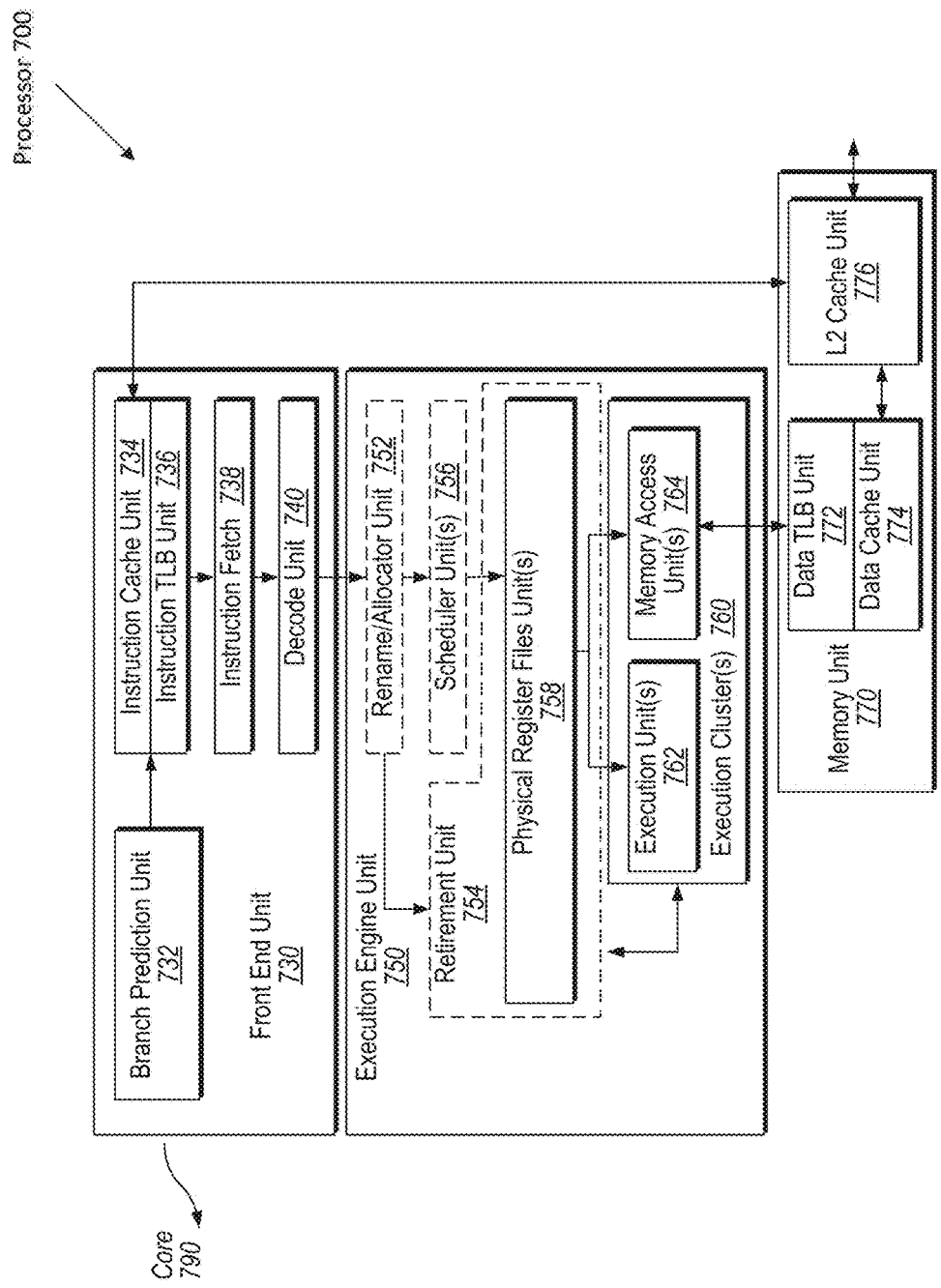
FIG. 7 is a block diagram illustrating a micro-architecture for the system of FIG. 1, according to one embodiment.

FIG. 7 is a block diagram illustrating a micro-architecture for a processor 700 that implements the system 100 of FIG. 1 according to one embodiment. Specifically, processor 700 depicts an in-order architecture core and a register renaming logic, out-of-order issue/execution logic to be included in a processor according to at least one embodiment of the disclosure. The embodiments of the system 100 of FIG. 1 may be implemented in processor 700.

Processor 700 includes a front end unit 730 coupled to an execution engine unit 750, and both are coupled to a memory unit 770. The processor 700 may include a core 790 that is a reduced instruction set computing (RISC) core, a complex instruction set computing (CISC) core, a very long instruction word (VLIW) core, or a hybrid or alternative core type. As yet another option, processor 700 may include a special-purpose core, such as, for example, a network or communication core, compression engine, graphics core, or the like. In another embodiment, the core 790 may have five stages.

The front end unit 730 includes a branch prediction unit 732 coupled to an instruction cache unit 734, which is coupled to an instruction translation lookaside buffer (TLB) unit 736, which is coupled to an instruction fetch unit 738, which is coupled to a decode unit 740. The decode unit 740 (also known as a decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. The instruction cache unit 734 is further coupled to the memory unit 770. The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations (RS), central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, etc., status (e.g., an address instruction pointer that is the address of the next instruction to be executed), etc. The physical register file(s) unit(s) 758 is overlapped by the retirement unit 754 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in order.

The set of memory access units 764 is coupled to the memory unit 770, which may include a data prefetcher, a data TLB unit 772, a data cache unit (DCU) 774, and a level 2 (L2) cache unit 776, to name a few examples. In some embodiments, DCU 774 is also known as a first level data cache (L1 cache). The DCU 774 may handle multiple outstanding cache misses and continue to service incoming stores and loads. It also supports maintaining cache coherency. The data TLB unit 772 is a cache used to improve virtual address translation speed by mapping virtual and physical address spaces. In one exemplary embodiment, the memory access units 764 may include a load unit, a store address unit, and a store data unit, each of which is coupled to the data TLB unit 772 in the memory unit 770. The L2 cache unit 776 may be coupled to one or more other levels of cache and eventually to the main memory.

In one embodiment, the data prefetcher speculatively loads/prefetches data to the DCU 774 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 700 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may not support multithreading (e.g., executing two or more parallel sets of operations or threads, time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology)).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 8:
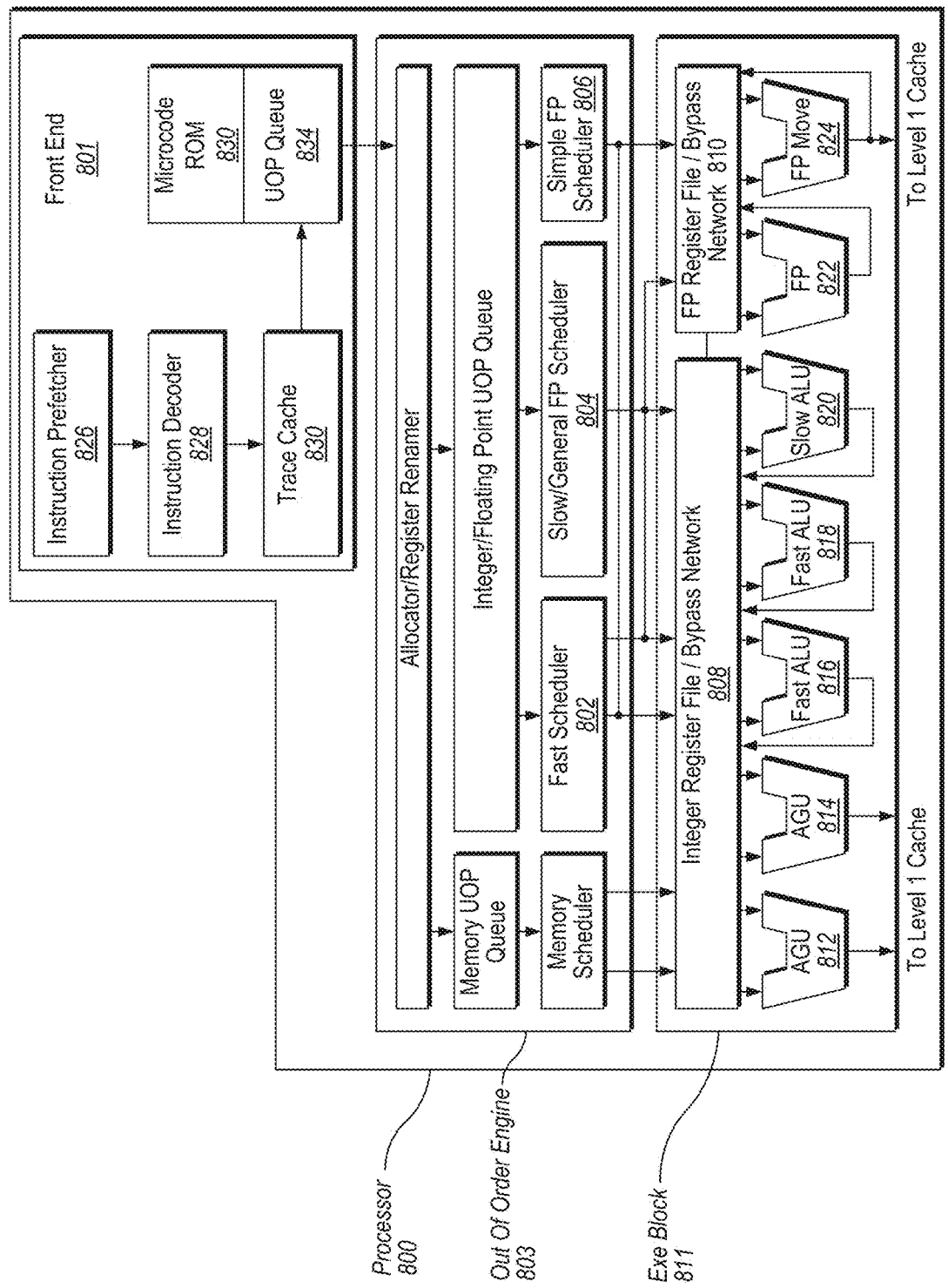
FIG. 8 illustrates a block diagram of the micro-architecture for a processor that includes logic circuits to perform access control, according to one embodiment.

FIG. 8 illustrates a block diagram of the micro-architecture for a processor 800 that includes logic circuits to perform access control according to one embodiment. In one embodiment, processor 800 is the system 100 of FIG. 1.

In some embodiments, an instruction in accordance with one embodiment may be implemented to operate on data elements having sizes of byte, word, doubleword, quadword, etc., as well as datatypes, such as single and double precision integer and floating point datatypes. In one embodiment the in-order front end 801 is the part of the processor 800 that fetches instructions to be executed and prepares them to be used later in the processor pipeline. The embodiments of the system 100 of FIG. 1 may be implemented in processor 800.

The front end 801 may include several units. In one embodiment, the instruction prefetcher 826 fetches instructions from memory and feeds them to an instruction decoder 828 which in turn decodes or interprets them. For example, in one embodiment, the decoder decodes a received instruction into one or more instructions called "micro-instructions" or "micro-operations" (also called micro-op or uops) that the machine may execute. In other embodiments, the decoder parses the instruction into an opcode and corresponding data and control fields that are used by the micro-architecture to perform operations in accordance with one embodiment. In one embodiment, the trace cache 830 takes decoded uops and assembles them into program ordered sequences or traces in the uop queue 834 for execution. When the trace cache 830 encounters a complex instruction, the microcode ROM 832 provides the uops needed to complete the operation.

Some instructions are converted into a single micro-op, whereas others need several micro-ops to complete the full operation. In one embodiment, if more than four micro-ops are needed to complete an instruction, the decoder 818 accesses the microcode ROM 832 to do the instruction. For one embodiment, an instruction may be decoded into a small number of micro-ops for processing at the instruction decoder 818. In another embodiment, an instruction may be stored within the microcode ROM 832 should a number of micro-ops be needed to accomplish the operation. The trace cache 830 refers to an entry point programmable logic array (PLA) to determine a correct micro-instruction pointer for reading the micro-code sequences to complete one or more instructions in accordance with one embodiment from the micro-code ROM 832. After the micro-code, ROM 832 finishes sequencing micro-ops for an instruction, the front end 801 of the machine resumes fetching micro-ops from the trace cache 830.

The out-of-order execution engine 803 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 802, slow/general floating point scheduler 804, and simple floating point scheduler 806. The uop schedulers 802, 804, 806, determine when a uop is ready to execute based on the readiness of their dependent input register operand sources and the availability of the execution resources the uops need to complete their operation. The fast scheduler 802 of one embodiment may schedule on each half of the main clock cycle while the other schedulers may only schedule once per main processor clock cycle. The schedulers arbitrate for the dispatch ports to schedule uops for execution.

Register files 808, 810, sit between the schedulers 802, 804, 806, and the execution units 812, 814, 816, 818, 820, 822, 824 in the execution block 811. There is a separate register file 808, 810, for integer and floating point operations, respectively. Each register file 808, 810, of one embodiment also includes a bypass network that may bypass or forward just completed results that have not yet been written into the register file to new dependent uops. The integer register file 808 and the floating point register file 810 are also capable of communicating data with the other. For one embodiment, the integer register file 808 is split into two separate register files, one register file for the low order 32 bits of data and a second register file for the high order 32 bits of data. The floating point register file 810 of one embodiment has 128 bit wide entries because floating point instructions typically have operands from 64 to 128 bits in width.

The execution block 811 contains the execution units 812, 814, 816, 818, 820, 822, 824, where the instructions are actually executed. This section includes the register files 808, 810, that store the integer and floating point data operand values that the micro-instructions need to execute. The processor 800 of one embodiment is comprised of a number of execution units: address generation unit (AGU) 812, AGU 814, fast ALU 816, fast ALU 818, slow ALU 820, floating point ALU 822, floating point move unit 824. For one embodiment, the floating point execution blocks 822, 824, execute floating point, MMX, SIMD, and SSE, or other operations. The floating point ALU 822 of one embodiment includes a 64-bit by 64-bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 816, 818. The fast ALUs 816, 818, of one embodiment may execute fast operations with an effective latency of half a clock cycle. For one embodiment, most complex integer operations go to the slow ALU 820 as the slow ALU 820 includes integer execution hardware for long latency type of operations, such as a multiplier, shifts, flag logic, and branch processing. Memory load/store operations are executed by the AGUs 812, 814. For one embodiment, the integer ALUs 816, 818, 820, are described in the context of performing integer operations on 64-bit data operands. In alternative embodiments, the ALUs 816, 818, 820, may be implemented to support a variety of data bits including 16, 32, 128, 256, etc. Similarly, the floating point units 822, 824, may be implemented to support a range of operands having bits of various widths. For one embodiment, the floating point units 822, 824, may operate on 128 bits wide packed data operands in conjunction with SIMD and multimedia instructions.

In one embodiment, the uops schedulers 802, 804, 806, dispatch dependent operations before the parent load has finished executing. As uops are speculatively scheduled and executed in processor 800, the processor 800 also includes logic to handle memory misses. If a data load misses in the data cache, there may be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 800 also includes logic to implement access control according to one embodiment. In one embodiment, the execution block 811 of processor 800 may include PEL, to perform access control according to the description herein.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein may be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, may operate with packed data elements that accompany SIMD and SSE instructions. Similarly, 128 bits wide XMM registers relating to SSE2, SSE3, SSE4, or beyond (referred to generically as "SSEx") technology may also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 9:
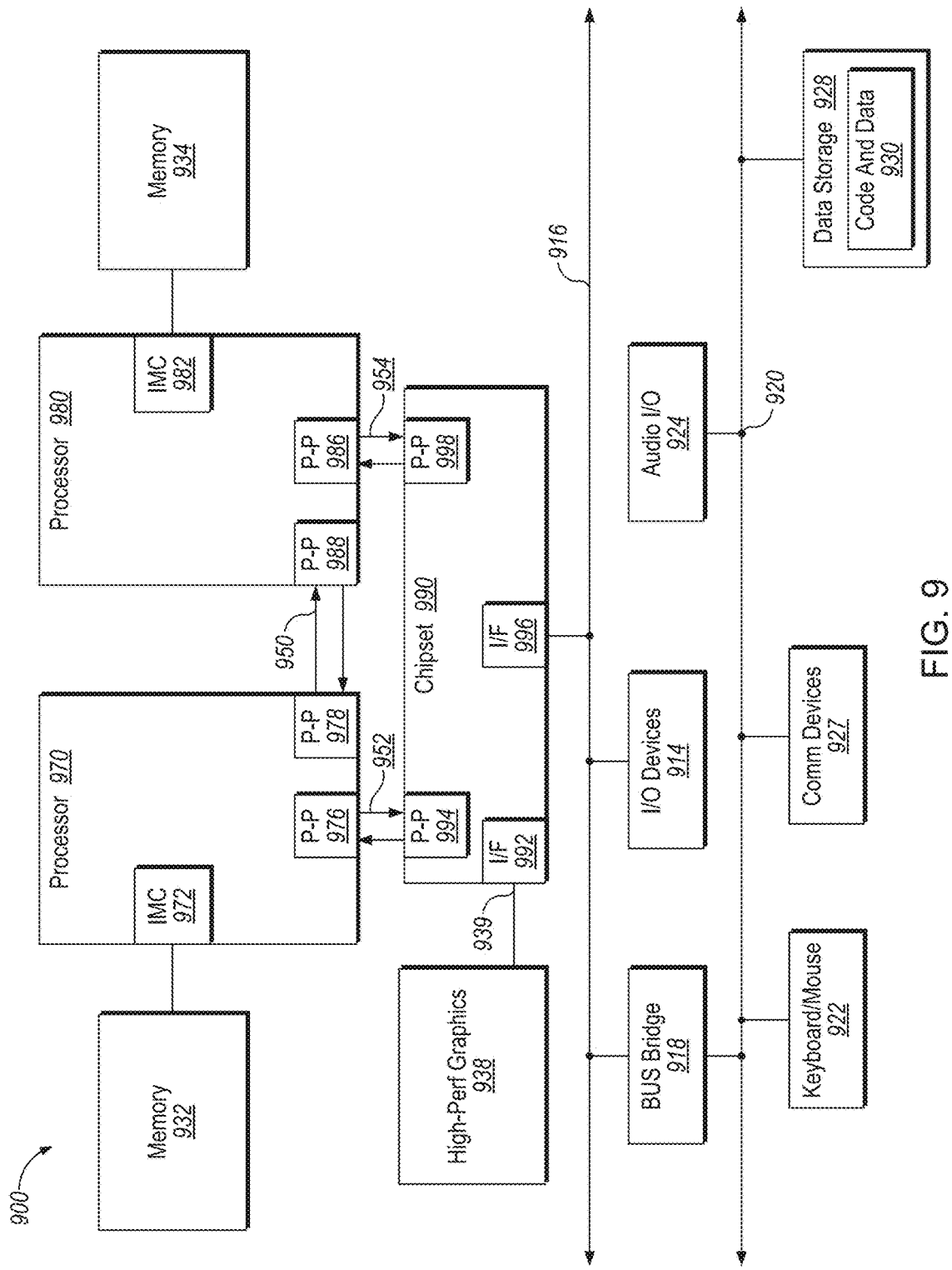
FIG. 9 is a block diagram of a computing system according to one implementation.

Embodiments may be implemented in many different system types. Referring now to FIG. 9, shown is a block diagram of a multiprocessor system 900 in accordance with an implementation. As shown in FIG. 9, multiprocessor system 900 is a point-to-point interconnect system and includes a first processor 970 and a second processor 980 coupled via a point-to-point interconnect 950. As shown in FIG. 9, each of processors 970 and 980 may be multicore processors, including first and second processor cores (i.e., processor cores 974a and 974b and processor cores 984a and 984b), although potentially many more cores may be present in the processors. The processors each may include hybrid write mode logics in accordance with an embodiment of the present. The embodiments of the system 100 of FIG. 1 may be implemented in the processor 970, processor 980, or both.

While shown with two processors 970, 980, it is to be understood that the scope of the present disclosure is not so limited. In other implementations, one or more additional processors may be present in a given processor.

Processors 970 and 980 are shown including integrated memory controller units 972 and 982, respectively. Processor 970 also includes as part of its bus controller units point-to-point (P-P) interfaces 976 and 988; similarly, second processor 980 includes P-P interfaces 986 and 988. Processors 970, 980 may exchange information via a point-to-point (P-P) interface 950 using P-P interface circuits 986, 988. As shown in FIG. 9, IMCs 972 and 982 couple the processors to respective memories, namely a memory 932 and a memory 934, which may be portions of main memory locally attached to the respective processors.

Processors 970, 980 may each exchange information with a chipset 990 via individual P-P interfaces 952, 954 using point to point interface circuits 976, 994, 986, 998. Chipset 990 may also exchange information with a high-performance graphics circuit 938 via a high-performance graphics interface 939.

A shared cache (not shown) may be included in either processor or outside of both processors, yet connected with the processors via P-P interconnect, such that either or both processors' local cache information may be stored in the shared cache if a processor is placed into a low power mode.

Chipset 990 may be coupled to a first bus 916 via an interface 996. In one embodiment, the first bus 916 may be a Peripheral Component Interconnect (PCI) bus, or a bus such as a PCI Express bus or another third generation I/O interconnect bus, although the scope of the present disclosure is not so limited.

As shown in FIG. 9, various I/O devices 914 may be coupled to first bus 916, along with a bus bridge 918 which couples first bus 916 to a second bus 920. In one embodiment, second bus 920 may be a low pin count (LPC) bus. Various devices may be coupled to second bus 920 including, for example, a keyboard and/or mouse 922, communication devices 927 and a storage unit 928 such as a disk drive or other mass storage device which may include instructions/code and data 930, in one embodiment. Further, an audio I/O 924 may be coupled to second bus 920. Note that other architectures are possible. For example, instead of the point-to-point architecture of FIG. 9, a system may implement a multi-drop bus or other such architecture.

Figure 10:
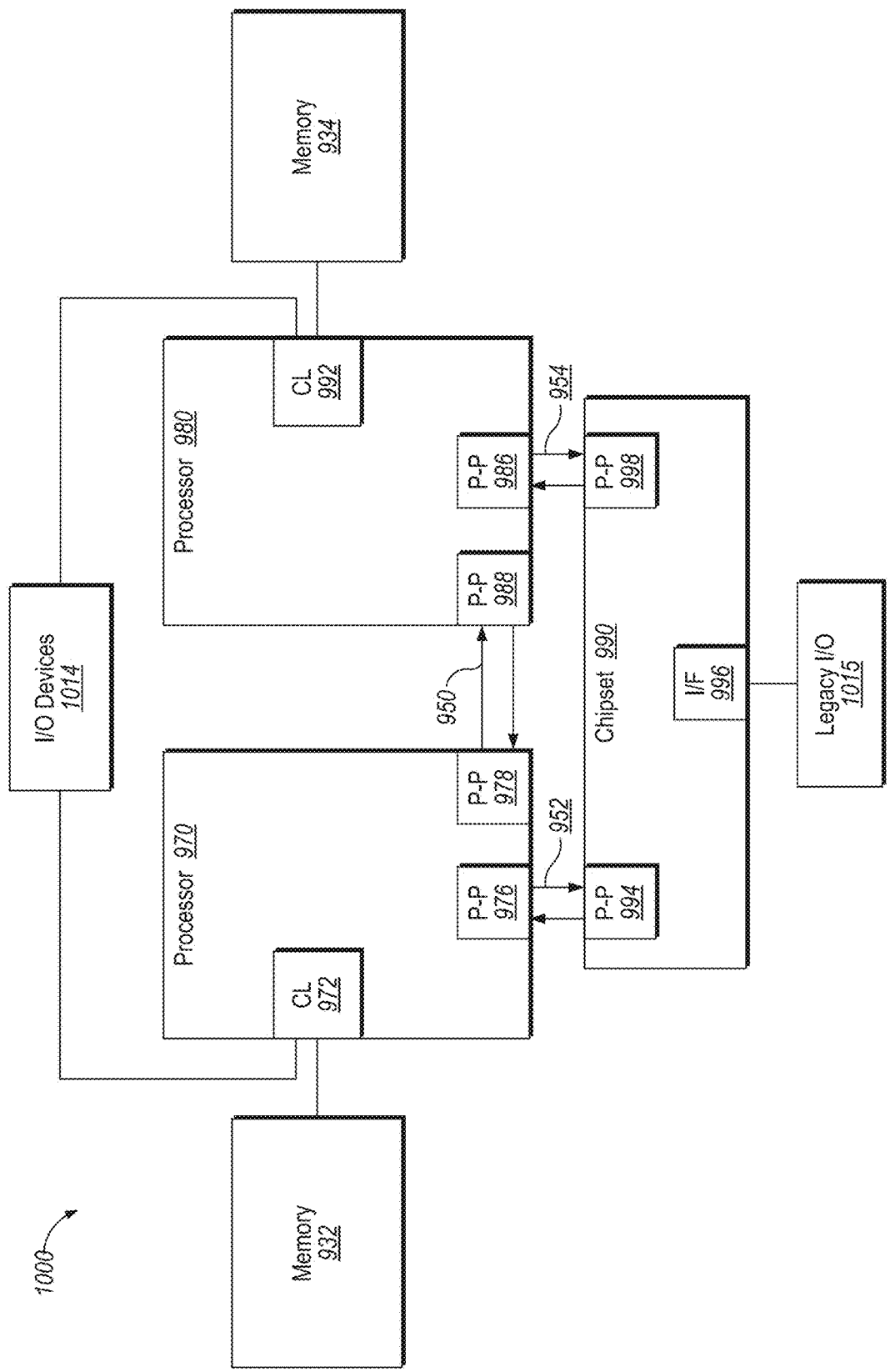
FIG. 10 is a block diagram of a computing system according to another implementation.

Referring now to FIG. 10, shown is a block diagram of a third system 1000 in accordance with an embodiment of the present disclosure. Like elements in FIGS. 8 and 10 bear like reference numerals and certain aspects of FIG. 8 have been omitted from FIG. 10 in order to avoid obscuring other aspects of FIG. 10.

FIG. 10 illustrates that the processors 970, 980 may include integrated memory and I/O control logic ("CL") 972 and 982, respectively. For at least one embodiment, the CL 972, 982 may include integrated memory controller units such as described herein. In addition. CL 972, 982 may also include I/O control logic. FIG. 10 illustrates that the memories 932, 934 are coupled to the CL 972, 982, and that I/O devices 1014 are also coupled to the control logic 972, 982. Legacy I/O devices 1015 are coupled to the chipset 990. The embodiments of the system 200 may be implemented in processor 970, processor 980, or both.

Figure 11:
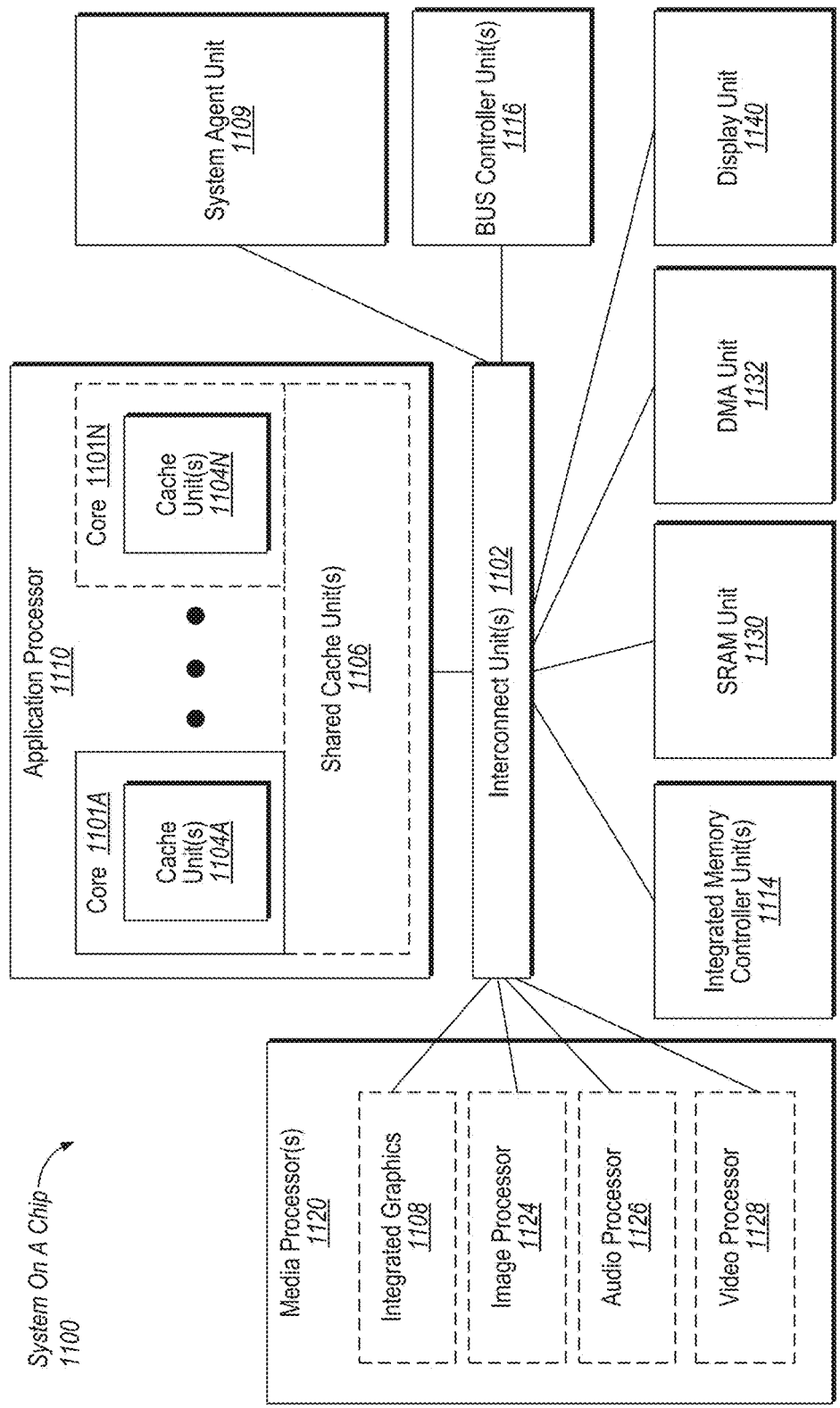
FIG. 11 is a block diagram of a system-on-a-chip according to one implementation.

FIG. 11 is an exemplary system on a chip (SoC) 1100 that may include one or more of the cores 1101. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, handheld devices, and various other electronic devices, are also suitable. In general, a huge variety of systems or electronic devices capable of incorporating a processor and/or other execution logic as disclosed herein are generally suitable.

Referring now to FIG. 11, shown is a block diagram of a SoC 1100 in accordance with an embodiment of the present disclosure. Also, dashed lined boxes are features on more advanced SoCs. In FIG. 11, an interconnect unit(s) 1102 is coupled to: an application processor 1110 which includes a set of one or more cores 1101A-N and shared cache unit(s) 1106; a system agent unit 1109; a bus controller unit(s) 1116; an integrated memory controller unit(s) 1114; a set or one or more media processors 1120 which may include integrated graphics logic 1108, an image processor 1124 for providing still and/or video camera functionality, an audio processor 1126 for providing hardware audio acceleration, and a video processor 1128 for providing video encode/decode acceleration; a static random access memory (SRAM) unit 1130; a direct memory access (DMA) unit 1132; and a display unit 1140 for coupling to one or more external displays. The embodiments of the pages additions and content copying may be implemented in SoC 1100.

Figure 12:
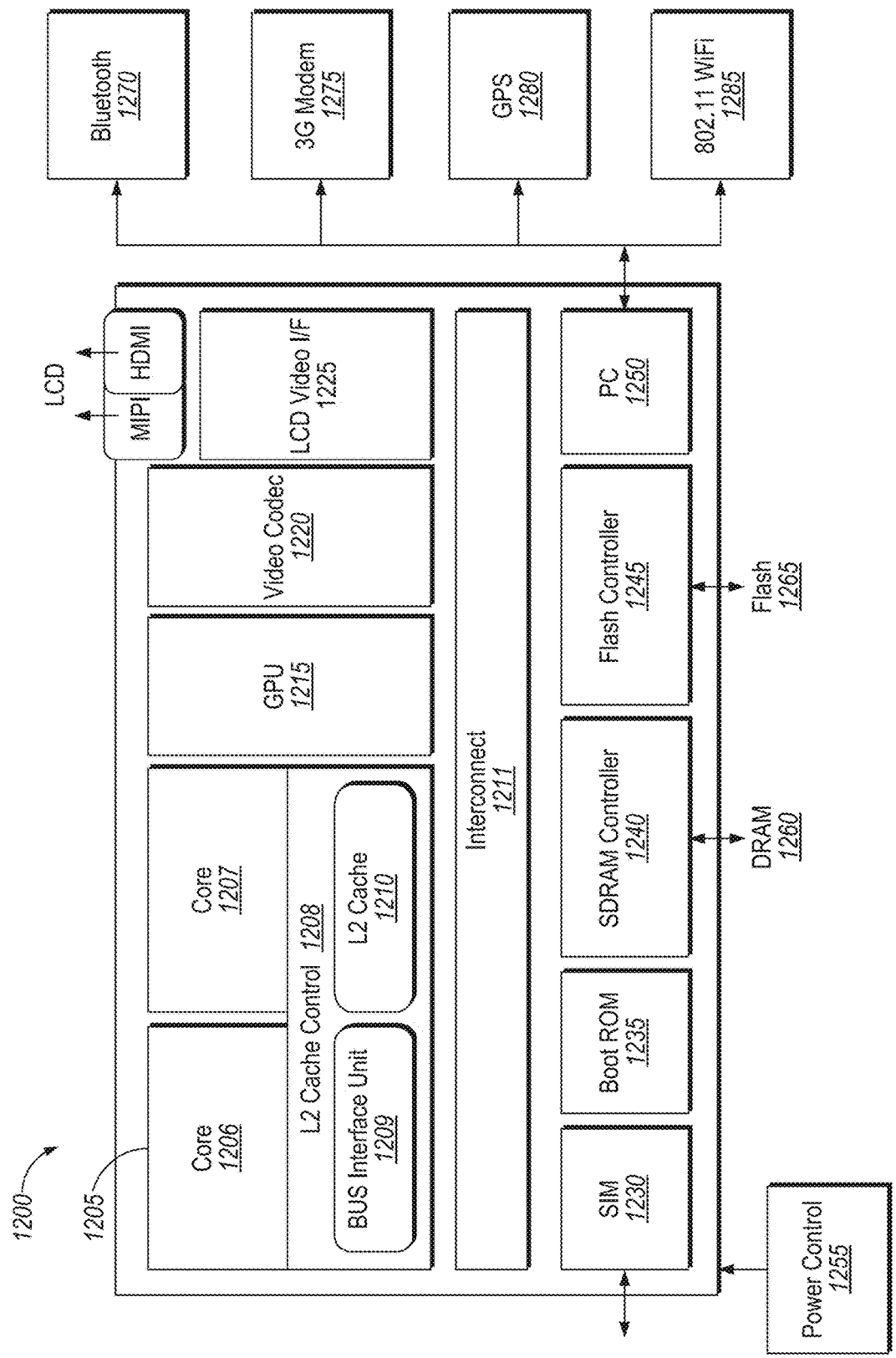
FIG. 12 illustrates another implementation of a block diagram of a computing system.

Turning next to FIG. 12, an embodiment of a system-on-a-chip (SoC) design in accordance with embodiments of the disclosure is depicted. As an illustrative example, SoC 1200 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which may correspond in nature to a mobile station (MS) in a GSM network. The embodiments of the system 100 of FIG. 1 may be implemented in SoC 1200.

Here, SoC 1200 includes 2 cores-1206 and 1207. Similar to the discussion above, cores 1206 and 1207 may conform to an Instruction Set Architecture, such as a processor having the Intel® Architecture Core™, an Advanced Micro Devices, Inc. (AMD) processor, an MIPS-based processor, an ARM-based processor design, or a customer thereof, as well as their licensees or adopters. Cores 1206 and 1207 are coupled to cache control 1208 that is associated with bus interface unit 1209 and L2 cache 1210 to communicate with other parts of system 1200. Interconnect 1211 includes an on-chip interconnect, such as an IOSF, AMBA, or other interconnects discussed above, which may implement one or more aspects of the described disclosure.

Interconnect 1211 provides communication channels to the other components, such as a Subscriber Identity Module (SIM) 1230 to interface with a SIM card, a boot ROM 1235 to hold boot code for execution by cores 1206 and 1207 to initialize and boot SoC 1200, a SDRAM controller 1240 to interface with external memory (e.g. DRAM 1260), a flash controller 1245 to interface with non-volatile memory (e.g. Flash 1265), a peripheral control 1250 (e.g. Serial Peripheral Interface) to interface with peripherals, video codecs 1220 and Video interface 1225 to display and receive input (e.g. touch-enabled input), GPU 1215 to perform graphics related computations, etc. Any of these interfaces may incorporate aspects of the embodiments described herein.

In addition, the system illustrates peripherals for communication, such as a Bluetooth module 1270, 3G modem 1275, GPS 1280, and Wi-Fi 1285. Note as stated above, a UE includes a radio for communication. As a result, these peripheral communication modules may not all be included. However, in a UE some form of a radio for external communication should be included.

Figure 13:
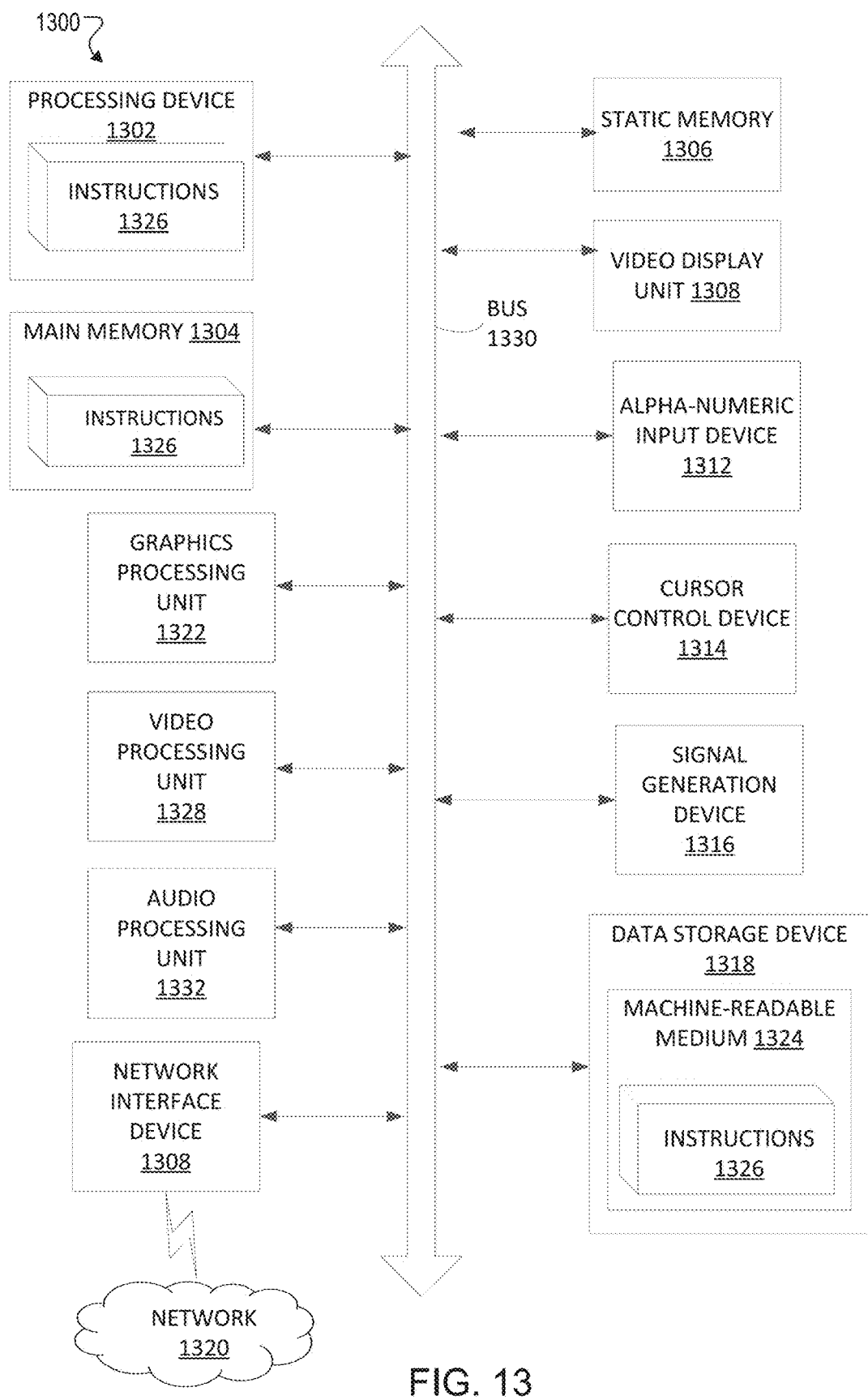
FIG. 13 illustrates another implementation of a block diagram of a computing system.

FIG. 13 illustrates a diagrammatic representation of a machine in the example form of a computing system 1300 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments of the system 100 of FIG. 1 may be implemented in computing system 1300.

The computing system 1300 includes a processing device 1302, main memory 1304 (e.g., read-only memory (ROM), flash memory, dynamic random access memory (DRAM) (such as synchronous DRAM (SDRAM) or DRAM (RDRAM), etc.), a static memory 1306 (e.g., flash memory, static random access memory (SRAM), etc.), and a data storage device 1318, which communicate with each other via a bus 1330.

Processing device 1302 represents one or more general-purpose processing devices such as a microprocessor, central processing unit, or the like. More particularly, the processing device may be a complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1302 may also be one or more special-purpose processing devices such as an application specific integrated circuit (ASIC), a field-programmable gate array (FPGA), a digital signal processor (DSP), network processor, or the like. In one embodiment, processing device 1302 may include one or processor cores. The processing device 1302 is configured to execute the instructions 1326 (e.g., processing logic) for performing the operations discussed herein. In one embodiment, processing device 1302 may include the system 200 of FIG. 2. Alternatively, the computing system 1300 may include other components as described herein. It should be understood that the core may not support multithreading (e.g., executing two or more parallel sets of operations or threads, time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology)).

The computing system 1300 may further include a network interface device 1308 communicably coupled to a network 1320. The computing system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), a signal generation device 1316 (e.g., a speaker), or other peripheral devices. Furthermore, computing system 1300 may include a graphics processing unit 1322, a video processing unit 1328 and an audio processing unit 1332. In another embodiment, the computing system 1300 may include a chipset (not illustrated), which refers to a group of integrated circuits, or chips, that are designed to work with the processing device 1302 and controls communications between the processing device 1302 and external devices. For example, the chipset may be a set of chips on a motherboard that links the processing device 1302 to very high-speed devices, such as main memory 1304 and graphic controllers, as well as linking the processing device 1302 to lower-speed peripheral buses of peripherals, such as USB, PCI or ISA buses.

The data storage device 1318 may include a computer-readable storage medium 1324 on which is stored instructions 1326 (e.g., software) embodying any one or more of the methodologies of functions described herein. The instructions 1326 (e.g., software) may also reside, completely or at least partially, within the main memory 1304 as instructions 1326 and/or within the processing device 1302 as processing logic during execution thereof by the computing system 1300; the main memory 1304 and the processing device 1302 also constituting computer-readable storage media.

The computer-readable storage medium 1324 may also be used to store instructions 1326 utilizing the processing device 1302, such as the processor core 102 described with respect to FIG. 1 or the system 200 described with respect to FIG. 2, and/or a software library containing methods that call the above applications. While the computer-readable storage medium 1324 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.
The following examples pertain to further embodiments.

Example 1 is a processor including: 1) a register to store a first prefetch value indicating a first amount of time to prefetch data from a memory prior to an execution of a subsequent instruction that uses the data; 2) a cache; 3) a processor core coupled to the cache and the register, where the processor core to: a) execute a prefetch instruction to access the data from the memory; b) store a copy of the data in the cache; and c) execute the subsequent instruction; and 4) a state machine coupled to the processor core, the state machine to: a) determine whether the first amount of time is insufficient to prefetch the data for the execution of the subsequent instruction; and b) change the first prefetch value to a second prefetch value when the first amount of time is insufficient, wherein the second prefetch value is greater than the first prefetch value.

In Example 2, the processor of Example 1 wherein: 1) the processor core further includes: a fill buffer with an entry that includes: a) a free entry field to store one or more bits indicating whether the entry in at the fill buffer is empty or occupied; b) a memory address field to store one or more bits indicating a location of the data in the memory; and c) a type field to store one or more bits indicating a type of a request to access the data stored in the memory; and 2) the state machine further includes: 1) a prefetch counter to store a first count value indicating a number of prefetch instructions previously executed by the processor core; and 2) a prefetch miss counter to store a second count value indicating a number of late prefetches for the prefetch instructions previously executed by the processor core.

In Example 3, the processor of any one of Examples 1-2, wherein to determine whether the first amount of time is insufficient to prefetch the data, the state machine is further to: 1) receive a copy of the request to access the data stored in the memory, the request including a first memory address of the data at the memory; 2) determine that the cache does not include an entry storing the copy of the data; 3) determine that the first memory address in the request does not match a second memory address in an entry of fill buffer; 4) allocate a new entry in the fill buffer for the first memory address; 5) determine that the request is the prefetch instruction; 6) set a type value for the type field at the entry to indicate the request is the prefetch instruction; 7) increase the prefetch counter value; and 8) execute a cache miss instruction.

In Example 4, the processor of any one of Examples 1-3, wherein to determine whether the first amount of time is insufficient to prefetch the data, the state machine is further to: 1) receive a copy of the request to access the data stored in the memory, the request including a first memory address of the data at the memory; 2) determine that the cache does not include an entry storing the copy of the data; 3) determine that the first memory address in the request does not match a second memory address in the fill buffer; 4) allocate a new entry in the fill buffer for the first memory address; 5) determine that the request is not the prefetch instruction; 6) set a type value for the type field at the entry to indicate the request is the prefetch instruction; and 7) execute a cache miss instruction.

In Example 5, the processor of any one of Examples 1-4, wherein to determine whether the first amount of time is insufficient to prefetch the data, the state machine is further to: 1) receive a copy of the request to access the data stored in the memory, the request including a first memory address of the data at the memory; 2) determine that the cache does not include an entry storing the copy of the data; 3) determine that the first memory address in the request matches a second memory address in the fill buffer; and 4) determine that the type field for the entry is set to indicate the request is not prefetch instruction.

In Example 6, the processor of any one of Examples 1-5, wherein to determine whether the first amount of time is insufficient to prefetch the data, the state machine is further to: 1) receive a copy of the request to access the data stored in the memory, the request including a first memory address of the data at the memory; 2) determine that the cache does not include an entry storing the copy of the data; 3) determine that the first memory address in the request matches a second memory address in the fill buffer; 4) determine that the type field for the entry is set to indicate that the request is the prefetch instruction; 5) set the type field for the entry to indicate the request is not the prefetch instruction; and 6) increase the second count value of the prefetch miss counter.

In Example 7, the processor of any one of Examples 1-6, wherein the fill buffer includes a plurality of fill buffer entries including an entry with a memory address corresponding to an address of the data in memory.

In Example 8, the processor of any one of Examples 1-7, wherein to update the first prefetch value to the second prefetch value, the state machine is further to: 1) receive a first request for the second prefetch value from the processor core, where the request includes the first prefetch value and a first window value indicating a second amount of time prior to a second request for the second prefetch value; 2) determine that the first amount of time prior to the execution of the subsequent instruction does not exceed a threshold amount of time; 3) divide the second count value by the first count value to obtain a fraction value; 4) reset the first count value and the second count value; 5) determine that the fraction value exceeds a threshold value; 6) increase the first prefetch value by a defined value to obtain the second prefetch value; 7) set an elapsed time value to zero; 8) increase the first window value by a third amount of time to obtain a second window value; 9) store the second prefetch value at the register; and 10) store the second window value at the register.

In Example 9, the processor of any one of Examples 1-8, wherein to update the first prefetch value to the second prefetch value, the state machine is further to: 1) receive a first request for the second prefetch value from the processor core, where the request includes the first prefetch value and a first window value indicating a second amount of time prior to a second request for the second prefetch value; 2) determine that the first amount of time prior to the execution of the subsequent instruction does not exceed a first threshold amount of time; 3) divide the second count value by the first count value to obtain a fraction value; 4) reset the first count value and the second count value; 5) determine that the fraction value does not exceed a threshold value; 6) determine that a third amount of time that the copy of the data is stored at the cache does not exceeds a second threshold amount of time; 7) increase the second amount of time by a fourth amount of time; 8) decrease the first window value by a fifth amount of time to obtain a second window value; and 9) store the second window value at the register.

In Example 10, the processor of any one of Examples 1-9, wherein to update the first prefetch value to the second prefetch value, the state machine is further to: 1) receive a first request for the second prefetch value from the processor core, where the request includes the first prefetch value and a first window value indicating a second amount of time prior to a second request for the second prefetch value; 2) determine that the first amount of time prior to the execution of the subsequent instruction does not exceed a first threshold amount of time; 3) divide the second count value by the first count value to obtain a fraction value; 4) reset the first count value and the second count value; 5) determine that the fraction value does not exceed a threshold value; 6) determine that a third amount of time that the copy of the data is stored at the cache exceeds a second threshold amount of time; 7) decrease the first prefetch value by a defined value to obtain the second prefetch value; 8) decrease the first window value by a fourth amount of time to obtain a second window value; 9) store the second prefetch value at the register; and 10) store the second window value at the register.

In Example 11, the processor of any one of Examples 1-10, wherein the state machine is further to: 1) receive a request for the second prefetch value from the processor core, where the request includes the first prefetch value and a window value indicating a second amount of time prior to a second request; 2) determine that the first amount of time prior to the execution of the subsequent instruction exceeds a threshold amount of time, indicating that the that the first amount of time is sufficient; and 3) send a response indicating that the first prefetch value and the window value are correct.

In Example 12, the processor of any one of Examples 1-11, wherein the threshold value is zero.

In Example 13, the processor of any one of Examples 1-12, wherein the first amount of time is insufficient to prefetch the data when the cache does not include an entry storing a copy of the data in the memory when the subsequent instruction is executed.

Various embodiments can have different combinations of the structural features described above. For instance, all optional features of the computing system described above can also be implemented with respect to the method or process described herein and specifics in the examples can be used anywhere in one or more embodiments.

Example 14 is a system including: 1) a memory to store data; 2) a register to store a first prefetch value indicating a first amount of time to prefetch data from the memory prior to an execution of a subsequent instruction that uses the data; 3) a cache; 4) a processor coupled to the register, the cache, and the memory, where the processor is to: a) execute a prefetch instruction to access the data from the memory; b) store a copy of the data in the cache; and c) execute the subsequent instruction to obtain a result data; 5) a graphics core coupled to the processor, the graphics core to generate a graphic using the result data; 6) a first counter to store a first count value indicating a number of prefetch instructions previously executed by the processor; 7) a second counter to store a second count value indicating a number of late prefetches for the prefetch instructions that were previously executed; and 8) a state machine coupled to the first counter and the second counter, where the state machine is to: a) in response to the execution of the prefetch instruction, determine that a late prefetch occurred; b) determine a second prefetch value using the first prefetch value, the first count value, and the second count value; and c) send the second prefetch value to the processor.

In Example 15, the system of Examples 14, wherein the late prefetches occurs when the first amount of time is insufficient to prefetch the data for the execution of a set of instructions.

In Example 16, the system of any one of Examples 14-15, further including a fill buffer that includes: 1) a free entry field to store one or more bits indicating whether an entry at the fill buffer is empty or occupied; 2) a memory address field to store one or more bits indicating a location of the data in the memory; and 3) a type field to store one or more bits a type of a request to access the data stored in the memory.

Example 17 is a hardware-implemented method including: a) storing a first prefetch value indicating an amount of time to prefetch data for a prefetch instruction prior to an execution of subsequent instruction that uses the data; 2) executing the prefetch instruction to request the data from a memory; 3) in response to the prefetch instruction, determining that the amount of time to prefetch the data prior to the execution of a subsequent instruction is insufficient; and 4) determining a second prefetch value indicating a sufficient amount of time to prefetch the data prior to the execution of the subsequent instruction.

In Example 18, the hardware-implemented method of Example 17, further including: further including storing an entry in a fill buffer, the entry including: 1) a free entry value indicating whether the entry at the fill buffer is empty or occupied; 2) a memory address indicating a location of the data in the memory; and 3) a type value indicating a type of a request to access the data stored in the memory.

In Example 19, the hardware-implemented method of any one of Examples 17-18, wherein determining that the amount of time to prefetch the data prior to the execution of a subsequent instruction is insufficient further comprises: 1) receiving a copy of a request to access the data stored in the memory, the request comprising the location of the data in the memory; 2) determining that the cache does not include a first entry storing a copy of the data; 3) determining that the memory address in the request does not match an address in the fill buffer; 4) allocating a second entry in the fill buffer for the data; 5) determining that the request is the prefetch instruction; 6) setting a type value for a type field at the second entry to indicate the request is the prefetch instruction; 7) increasing the first prefetch value by a defined amount to obtain the second prefetch value; and 8) executing a cache miss instruction.

In Example 20, the hardware-implemented method of any one of Examples 17-19, further including: 1) storing the data at a cache for a period of time; and 2) deleting the data from the cache when the period of time expires.

Various embodiments may have different combinations of the structural features described above. For instance, all optional features of the computing system described above may also be implemented with respect to the method or process described herein and specifics in the examples may be used anywhere in one or more embodiments.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computing system have not been described in detail in order to avoid unnecessarily obscuring the present disclosure.

The embodiments are described with reference to access control in specific integrated circuits, such as in computing platforms or microprocessors. The embodiments may also be applicable to other types of integrated circuits and programmable logic devices. For example, the disclosed embodiments are not limited to desktop computing systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that may perform the functions and operations taught below. It is described that the system may be any kind of computer or embedded system. The disclosed embodiments may especially be used for low-end devices, like wearable devices (e.g., watches), electronic implants, sensory and control infrastructure devices, controllers, supervisory control, and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure may be applied to other types of circuits or semiconductor devices that may benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and may be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure may be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions may be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, a reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as may be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, wherein the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computing systems have been used. For example, the decimal number ten may also be represented as a binary value of 1010 and a hexadecimal letter A. Therefore, a value includes any representation of information capable of being held in a computing system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information therefrom.

Instructions used to program logic to perform embodiments of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplary language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein may be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:
a register to store a first prefetch value indicating a first amount of time to prefetch data from a memory prior to an execution of a subsequent instruction that uses the data;
a cache;
a execution circuitry coupled to the cache and the register, the execution circuitry to:
execute a prefetch instruction to access the data from the memory;
store a copy of the data in the cache; and
execute the subsequent instruction; and
a programmable logic circuit coupled to the execution circuitry, the programmable logic circuit to:
change the first prefetch value to a second prefetch value responsive to the first amount of time being determined to be insufficient to prefetch, wherein the second prefetch value is greater than the first prefetch value.

2. The processor of claim 1, wherein:
the execution circuitry further comprises a fill buffer with an entry that includes:
a free entry field to store one or more bits indicating whether the entry in at the fill buffer is empty or occupied;
a memory address field to store one or more bits indicating a location of the data in the memory; and
a type field to store one or more bits indicating a type of a request to access the data stored in the memory; and
the programmable logic circuit further comprises:
a prefetch counter to store a first count value indicating a number of prefetch instructions previously executed by the execution circuitry; and
a prefetch miss counter to store a second count value indicating a number of late prefetches for prefetch instructions previously executed by the execution circuitry.

3. The processor of claim 2, wherein the programmable logic circuit is to determine whether the first amount of time is insufficient to prefetch the data for the execution of the subsequent instruction, and wherein to determine whether the first amount of time is insufficient to prefetch the data, the programmable logic circuit is further to:
receive a copy of the request to access the data stored in the memory, the request including a first memory address of the data at the memory;
determine that the cache does not include an entry storing the copy of the data;
determine that the first memory address in the request does not match a second memory address in an entry of fill buffer;
allocate a new entry in the fill buffer for the first memory address;
determine that the request is the prefetch instruction;
set a type value for the type field at the entry to indicate the request is the prefetch instruction;
increase the first count value of the prefetch counter; and
execute a cache miss instruction.

4. The processor of claim 2, wherein the programmable logic circuit is to determine whether the first amount of time is insufficient to prefetch the data for the execution of the subsequent instruction, and wherein to determine whether the first amount of time is insufficient to prefetch the data, the programmable logic circuit is further to:
receive a copy of the request to access the data stored in the memory, the request including a first memory address of the data at the memory;
determine that the cache does not include an entry storing the copy of the data;
determine that the first memory address in the request does not match a second memory address in the fill buffer;
allocate a new entry in the fill buffer for the first memory address;
determine that the request is not the prefetch instruction;
set a type value for the type field at the entry to indicate the request is the prefetch instruction; and
execute a cache miss instruction.

5. The processor of claim 2, wherein the programmable logic circuit is to determine whether the first amount of time is insufficient to prefetch the data for the execution of the subsequent instruction, and wherein to determine whether the first amount of time is insufficient to prefetch the data, the programmable logic circuit is further to:
receive a copy of the request to access the data stored in the memory, the request including a first memory address of the data at the memory;
determine that the cache does not include an entry storing the copy of the data;
determine that the first memory address in the request matches a second memory address in the fill buffer; and
determine that the type field for the entry is set to indicate the request is not prefetch instruction.

6. The processor of claim 2, wherein the programmable logic circuit is to determine whether the first amount of time is insufficient to prefetch the data for the execution of the subsequent instruction, and wherein to determine whether the first amount of time is insufficient to prefetch the data, the programmable logic circuit is further to:
receive a copy of the request to access the data stored in the memory, the request including a first memory address of the data at the memory;
determine that the cache does not include an entry storing the copy of the data;
determine that the first memory address in the request matches a second memory address in the fill buffer;
determine that the type field for the entry is set to indicate that the request is the prefetch instruction;
set the type field for the entry to indicate the request is not the prefetch instruction; and
increase the second count value of the prefetch miss counter.

7. The processor of claim 2, wherein the fill buffer comprises a plurality of fill buffer entries including an entry with a memory address corresponding to an address of the data in memory.

8. The processor of claim 2, wherein to update the first prefetch value to the second prefetch value, the programmable logic circuit is further to:
receive a first request for the second prefetch value from the execution circuitry, wherein the request includes the first prefetch value and a first window value indicating a second amount of time prior to a second request for the second prefetch value;
determine that the first amount of time prior to the execution of the subsequent instruction does not exceed a threshold amount of time;
divide the second count value by the first count value to obtain a fraction value;

reset the first count value and the second count value;
determine that the fraction value exceeds a threshold value;
increase the first prefetch value by a defined value to obtain the second prefetch value;
set an elapsed time value to zero;
increase the first window value by a third amount of time to obtain a second window value;
store the second prefetch value at the register; and
store the second window value at the register.

9. The processor of claim 2, wherein to update the first prefetch value to the second prefetch value, the programmable logic circuit is further to:
receive a first request for the second prefetch value from the execution circuitry, wherein the request includes the first prefetch value and a first window value indicating a second amount of time prior to a second request for the second prefetch value;
determine that the first amount of time prior to the execution of the subsequent instruction does not exceed a first threshold amount of time;
divide the second count value by the first count value to obtain a fraction value;
reset the first count value and the second count value;
determine that the fraction value does not exceed a threshold value;
determine that a third amount of time that the copy of the data is stored at the cache does not exceeds a second threshold amount of time;
increase the second amount of time by a fourth amount of time;
decrease the first window value by a fifth amount of time to obtain a second window value; and
store the second window value at the register.

10. The processor of claim 2, wherein to update the first prefetch value to the second prefetch value, the programmable logic circuit is further to:
receive a first request for the second prefetch value from the execution circuitry, wherein the request includes the first prefetch value and a first window value indicating a second amount of time prior to a second request for the second prefetch value;
determine that the first amount of time prior to the execution of the subsequent instruction does not exceed a first threshold amount of time;
divide the second count value by the first count value to obtain a fraction value;
reset the first count value and the second count value;
determine that the fraction value does not exceed a threshold value;
determine that a third amount of time that the copy of the data is stored at the cache exceeds a second threshold amount of time;
decrease the first prefetch value by a defined value to obtain the second prefetch value;
decrease the first window value by a fourth amount of time to obtain a second window value;
store the second prefetch value at the register; and
store the second window value at the register.

11. The processor of claim 1, wherein the programmable logic circuit is further to:
receive a request for the second prefetch value from the execution circuitry, wherein the request includes the first prefetch value and a window value indicating a second amount of time prior to a second request;
determine that the first amount of time prior to the execution of the subsequent instruction exceeds a threshold amount of time, indicating that the first amount of time is sufficient; and
send a response indicating that the first prefetch value and the window value are correct.

12. The processor of claim 11, wherein the threshold amount of time is zero.

13. The processor of claim 1, wherein the first amount of time is insufficient to prefetch the data when the cache does not include an entry storing a copy of the data in the memory when the subsequent instruction is executed.

* * * * *